(12) United States Patent
Li et al.

(10) Patent No.: US 11,444,758 B2
(45) Date of Patent: Sep. 13, 2022

(54) KEY GENERATION DEVICE AND METHOD

(71) Applicant: Huawei Technologies Co., Ltd., Shenzhen (CN)

(72) Inventors: Zhengyu Li, Shenzhen (CN); Changzheng Su, Shenzhen (CN); Yang Zou, Oerlikon (CH); Yongjing Cai, Zürich (CH)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 16/868,789

(22) Filed: May 7, 2020

(65) Prior Publication Data

US 2020/0266978 A1    Aug. 20, 2020

Related U.S. Application Data

(63) Continuation of application No. PCT/CN2018/090471, filed on Jun. 8, 2018.

(30) Foreign Application Priority Data

Nov. 24, 2017   (CN) .......................... 201711194180.1

(51) Int. Cl.
*H04L 9/08* (2006.01)
*G02B 27/28* (2006.01)
(Continued)

(52) U.S. Cl.
CPC .......... *H04L 9/0858* (2013.01); *G02B 27/283* (2013.01); *H03M 1/12* (2013.01);
(Continued)

(58) Field of Classification Search
CPC ... H04L 9/0858; H04L 9/0822; G02B 27/283; H03M 1/12; H04B 10/5561; H04B 10/64
(Continued)

(56) References Cited

U.S. PATENT DOCUMENTS 7,889,868 B2 * 2/2011 Wellbrock ............ H04L 9/0855
  713/168
7,974,540 B2 * 7/2011 Tomita .................. H04L 9/0858
  380/278

(Continued)

FOREIGN PATENT DOCUMENTS

CN          1897519 A         1/2007
CN        102724036 A        10/2012
(Continued)

OTHER PUBLICATIONS

Min et al; Continuous variable quantum key distribution; 2017; Physics; pp. 1-9. (Year: 2017).*

(Continued)

*Primary Examiner* — Amritbir K Sandhu
(74) *Attorney, Agent, or Firm* — Conley Rose, P.C.

(57) ABSTRACT

A key generation method includes modulating a first key to a first light source signal, to obtain a modulated optical signal, splitting the modulated optical signal, to obtain a first sub modulated optical signal and a second sub modulated optical signal, attenuating the first sub modulated optical signal such that a quantity of photons included in each period of the first sub modulated optical signal is less than a preset value, and sending an attenuated first sub modulated optical signal to a receive-end device, and obtaining a second key carried in the second sub modulated optical signal, and storing the second key.

20 Claims, 13 Drawing Sheets

(51) Int. Cl.
*H03M 1/12* (2006.01)
*H04B 10/556* (2013.01)
*H04B 10/64* (2013.01)

(52) U.S. Cl.
CPC ......... *H04B 10/5561* (2013.01); *H04B 10/64* (2013.01); *H04L 9/0822* (2013.01)

(58) Field of Classification Search
USPC .......................................................... 380/44
See application file for complete search history.

(56) References Cited

U.S. PATENT DOCUMENTS

| | | | | |
|---|---|---|---|---|
| 9,847,876 | B2* | 12/2017 | Choi | H04L 9/0861 |
| 11,070,370 | B2* | 7/2021 | Guo | H04J 14/0282 |
| 2006/0280509 | A1* | 12/2006 | Tomaru | H04L 9/0858 |
| | | | | 398/188 |
| 2016/0013937 | A1 | 1/2016 | Choi et al. | |
| 2018/0294961 | A1 | 10/2018 | Wang et al. | |
| 2020/0162248 | A1* | 5/2020 | Qi | H04B 10/70 |
| 2020/0266978 | A1* | 8/2020 | Li | H04L 9/0858 |
| 2021/0044432 | A1* | 2/2021 | Li | H04L 9/0822 |

FOREIGN PATENT DOCUMENTS

| | | |
|---|---|---|
| CN | 102868524 A | 1/2013 |
| CN | 102916807 A | 2/2013 |
| CN | 104104502 A | 10/2014 |
| CN | 104539582 A | 4/2015 |
| CN | 105897414 A | 8/2016 |
| CN | 106788706 A | 5/2017 |
| CN | 106850196 A | 6/2017 |
| CN | 106850217 A | 6/2017 |
| CN | 107070560 A | 8/2017 |
| CN | 107086891 A | 8/2017 |
| CN | 107368282 A | 11/2017 |
| JP | 1962700 B2 | 6/2012 |
| WO | 2006137021 A1 | 12/2006 |

OTHER PUBLICATIONS

Zheng et al; Practical Security of continuous-variable quantum key distribution with reduced optical attenuation, 2019, research gate ; pp. 1-10. (Year: 2019).*
Zheng et al; Practical security of continuous-variable quantum key distribution with reduced optical attenuation, Apr. 2019; Institute of quantum information and key laboratory of high performance computing; pp. 1-9. (Year: 2019).*
Wittman, C., et al., "Quantum Key Distribution with Heterodyne Detection," EQEC 2009, 1 page.
Brunner, H. et al. "A low-complexity heterodyne CV-QKD architecture," ICTON, 2017, 4 pages.
Huang, P., et al. "The Development of Study on Practical Security of Continuous-variable Quantum Key Distribution, Netinfo Security," Nov. 2017, pp. 7-18. with English abstract.
Li., Y., et al., "Continuous variable quantum key distribution," Chinese Physics B, vol. 26, No. 4, Apr. 1, 2017, p. 1-7, XP055737516.
Fossier, S., et al., "Field test of a continuous-variable quantum key distribution prototype," New Journal of Physics, Institute of Physics Publishing, Bristol, GB, vol. 11, No. 4, Apr. 1, 2009, p. 45023 1-14, XP020154510.

* cited by examiner

KEY GENERATION DEVICE AND METHOD

CROSS-REFERENCE TO RELATED APPLICATIONS

This application is a continuation application of International Patent Application No. PCT/CN2018/090471, filed on Jun. 8, 2018, which claims priority to Chinese Patent Application No. 201711194180.1, filed on Nov. 24, 2017. The disclosures of the aforementioned applications are hereby incorporated by reference in their entireties.

TECHNICAL FIELD

This application relates to the field of quantum communications technologies, and in particular, to a key generation device and method.

BACKGROUND

With development of science and technologies and gradually deepening of global informatization, people have an increasingly high requirement on communication security. How to ensure communication security becomes a subject of research.

In a continuous exploration process, people discover that security of a key in a transmission process can be ensured using a secure quantum communications system that is based on a quantum mechanics principle. In the secure quantum communications system, the key is no longer transmitted in a form of an electrical signal, but is transmitted in a form of a quantum signal. In quantum mechanics, there is a classic theory, namely, the "Heisenberg's uncertainty principle". According to this theory, it can be deduced that to eavesdrop a key in a key transmission process, an eavesdropper needs to measure the key. However, a measurement operation inevitably causes interference to a coherent state of the key. In this way, if a key originally carried in a quantum signal is A, a key carried in the quantum signal is B after eavesdropping. If a transmit-end device and a receive-end device discover, through communication in a decryption process, that a bit error rate during decryption exceeds a preset threshold, it is considered that the key B obtained by the receive-end device is incorrect, and it is known that the key A is leaked.

For a specific preparation process of the key, refer to FIG. 1. In a preparation module, a light source is modulated using a random key generated by a random source, to generate a modulated optical signal that carries the random key. The transmit-end device directly stores the random key locally as an initial key A. For example, the random key may be a random number between −1 and +1, or a random number between −10 and +10. A modulator for modulating the light source in the modulation module has an inherent disadvantage. As a result, not all modulated light obtained through modulation that carries the random key corresponds to the random key. Therefore, modulated light that is sent through a channel and that carries the random key may not correspond to the initial key A locally stored in the transmit-end device. Consequently, when the receive-end device receives the modulated light that carries the random key, an initial key B obtained by the receive-end device by detecting the modulated light that carries the random key does not correspond to the initial key A locally stored in the transmit-end device. Finally, at a post-processing stage, the transmit-end device publishes a small amount of information about the initial key A to the receive-end device such that the receive-end device can determine that the detected initial key B does not correspond to the initial key A stored in the transmit-end device. In this way, the transmit-end device and the receive-end device discard the initial keys A and B, and re-prepare and transmit new initial keys. Repetition of this greatly decreases a success rate of preparing and transmitting an initial key, causing system resource waste.

SUMMARY

This application provides the following technical solutions.

According to a first aspect of embodiments of this application, a key generation device is provided, where the device includes a key generator, a modulator, a light source generator, a first beam splitter, a data obtainer, an attenuator, and a memory, where the key generator is configured to generate a first key, the modulator is configured to modulate the first key to a first light source signal, to obtain a modulated optical signal, the first beam splitter is configured to split the modulated optical signal, to obtain a first sub modulated optical signal and a second sub modulated optical signal, the attenuator is configured to attenuate the first sub modulated optical signal such that a quantity of photons included in each period of the first sub modulated optical signal is less than a preset value, and send an attenuated first sub modulated optical signal to a receive-end device, and the data obtainer is configured to obtain a second key carried in the second sub modulated optical signal, and store the second key in the memory, where the second key is a key obtained after a bit error occurs when the first key is modulated to the first light source signal, and the second key is a key to be used during communication with the receive-end device.

According to the key generation device provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by a transmit-end device. This avoids a case in which an association between the second key stored in the transmit-end device and the key used for communication with the receive-end device is relatively weak. Further, this can improve a success rate of preparing and transmitting a key, thereby avoiding system resource waste.

The attenuator may be used to attenuate the first sub modulated optical signal, to attenuate, to an extremely weak coherent state required by a continuous-variable quantum key distribution (CV-QKD) protocol, a laser beam that has relatively strong power and that is output by a light source generator such as a laser. In an embodiment, a quantity of photons included in each period is less than 100. It should be noted that in a CV-QKD system, a light source signal may be first modulated and then attenuated, or a light source signal may be first attenuated and then modulated. However, in this embodiment of this application, preferably, the light source signal is first modulated and then attenuated. Before the light source signal is attenuated, power of the light source signal is still relatively strong and is not prone to be affected by quantum noise. Therefore, precision of measuring the light source signal by the data obtainer is relatively high.

In a possible implementation, the device further includes a second beam splitter, and the data obtainer includes a heterodyne detector, a first analog-to-digital converter, and a processor, where the second beam splitter is configured to split an original light source signal generated by the light source generator, to obtain the first light source signal and a second light source signal, the heterodyne detector is configured to detect the second sub modulated optical signal and the second light source signal, to obtain a first analog electrical signal that carries regular component information of the second sub modulated optical signal, the first analog-to-digital converter is configured to perform analog-to-digital conversion on the first analog electrical signal to obtain a first digital electrical signal that carries the regular component information of the second sub modulated optical signal, and send the first digital electrical signal to the processor, and the processor is configured to obtain the second key based on the regular component information of the second sub modulated optical signal and a preset first data obtaining algorithm.

In a possible implementation, the processor is configured to obtain the second key based on the regular component information of the second sub modulated optical signal, detection efficiency of the heterodyne detector, intensity information of the second light source signal, a beam splitting ratio of the first beam splitter, transmittance of the attenuator, and the preset first data obtaining algorithm.

In a possible implementation, the preset first data obtaining algorithm is $$x_A = \frac{1}{\eta_D}\sqrt{\frac{2\eta_{310}k_{240}}{I_{LO}}\frac{V_A+1}{V_A-1}}\,X, \text{ and } p_A = -\frac{1}{\eta_D}\sqrt{\frac{2\eta_{310}k_{240}}{I_{LO}}\frac{V_A+1}{V_A-1}}\,P,$$

where $\eta_D$ is the detection efficiency of the heterodyne detector, $I_{LO}$ is the intensity information of the second light source signal, $k_{240}$ is the beam splitting ratio of the first beam splitter, $\eta_{310}$ is the transmittance of the attenuator, $V_A$ is an equivalent variance of an entangled state, X and P are the regular component information of the second sub modulated optical signal, and $x_A$ and $p_A$ constitute the second key.

During implementation, before the modulated optical signal is attenuated to a quantum signal, the modulated optical signal is first split, and the heterodyne detector is used to detect the second sub modulated optical signal obtained through splitting. The second sub modulated optical signal entering the heterodyne detector and a quantum signal entering a channel have a same modulation feature and vary only in a linear attenuation degree in terms of intensity. Therefore, there is a fairly good association between a detection result of the heterodyne detector and an actually sent quantum signal. The key carried in the second sub modulated light can be obtained using the preset first data obtaining algorithm and by considering an optical-to-electrical conversion coefficient in a detection process and transmittance during attenuation as factors affecting the key. In this case, there is a very good association between the key carried in the second sub modulated light and a key carried in the actually sent quantum signal.

In a possible implementation, the device further includes a third beam splitter, a fourth beam splitter, and a fifth beam splitter, and the data obtainer includes a first optoelectronic detector, a second optoelectronic detector, a homodyne detector, a second analog-to-digital converter, and a processor, where the third beam splitter is configured to split an original light source signal generated by the light source generator, to obtain the first light source signal and a second light source signal, the fifth beam splitter is configured to split the second sub modulated optical signal, to obtain a third sub modulated optical signal and a fourth sub modulated optical signal, the first optoelectronic detector is configured to detect the third sub modulated optical signal, to obtain a second analog electrical signal that carries intensity information of the third sub modulated optical signal, the fourth beam splitter is configured to split the second light source signal, to obtain a first sub light source signal and a second sub light source signal, the homodyne detector is configured to detect the first sub light source signal and the fourth sub modulated optical signal, to obtain a third analog electrical signal that carries intensity information of a signal obtained after coherence between the first sub light source signal and the fourth sub modulated optical signal, the second optoelectronic detector is configured to detect the second sub light source signal, to obtain a fourth analog electrical signal that carries intensity information of the second sub light source signal, the second analog-to-digital converter is configured to perform analog-to-digital conversion on the second analog electrical signal to obtain a second digital electrical signal that carries the intensity information of the third sub modulated optical signal, perform analog-to-digital conversion on the third analog electrical signal to obtain a third digital electrical signal that carries the intensity information of the signal obtained after the coherence between the first sub light source signal and the fourth sub modulated optical signal, perform analog-to-digital conversion on the fourth analog electrical signal to obtain a fourth digital electrical signal that carries the intensity information of the second sub light source signal, and send the second digital electrical signal, the third digital electrical signal, and the fourth digital electrical signal to the processor, and the processor is configured to obtain the second key based on the intensity information of the third sub modulated optical signal, the intensity information of the signal obtained after the coherence between the first sub light source signal and the fourth sub modulated optical signal, the intensity information of the second sub light source signal, and a preset second data obtaining algorithm.

In a possible implementation, the processor is configured to obtain the second key based on the intensity information of the third sub modulated optical signal, the intensity information of the signal obtained after the coherence between the first sub light source signal and the fourth sub modulated optical signal, the intensity information of the second sub light source signal, a beam splitting ratio of the first beam splitter, transmittance of the attenuator, and the preset second data obtaining algorithm.

In a possible implementation, the preset second data obtaining algorithm is $$x_A = \sqrt{2\frac{V_A+1}{V_A-1}}\,\sqrt{\eta_{310}k_{240}}\,\sqrt{I_S}\cos\left(\cos^{-1}\frac{I_{BHD}}{2\sqrt{I_S I_{LR}}}\right), \text{ and }$$

$$p_A = -\sqrt{2\frac{V_A+1}{V_A-1}}\,\sqrt{\eta_{310}k_{240}}\,\sqrt{I_S}\sin\left(\cos^{-1}\frac{I_{BHD}}{2\sqrt{I_S I_{LR}}}\right),$$

where $I_S$ is the intensity information of the third sub modulated optical signal, $I_{LR}$ is the intensity information of the second sub light source signal, $I_{BHD}$ is the intensity information of the signal obtained after the coherence between the first sub light source signal and the fourth sub modulated optical signal, $k_{240}$ is the beam splitting ratio of the first beam splitter, $\eta_{310}$ is the transmittance of the attenuator, $V_A$ is an equivalent variance of an entangled state, and $x_A$ and $p_A$ constitute the second key.

The first optoelectronic detector, the second optoelectronic detector, and the homodyne detector are used to replace the heterodyne detector to detect an optical signal. The heterodyne detector can detect two regular components of the second sub modulated optical signal, namely, an X component and a Y component. To detect the two regular components of the second sub modulated optical signal, the second sub modulated optical signal needs to be split again inside the heterodyne detector. To obtain a precise detection result, a relatively high requirement needs to be imposed on each of beam splitting ratio consistency and delay consistency inside the heterodyne detector. When a deviation occurs, the detection result has a deviation. Further, a data obtaining algorithm may further need to be modified, to compensate for the deviation. However, when the first optoelectronic detector, the second optoelectronic detector, and the homodyne detector are used to replace the heterodyne detector to perform detection, an optical signal no longer needs to be split inside the first optoelectronic detector, the second optoelectronic detector, and the homodyne detector. This imposes a low requirement on the component and is easy to implement.

In a possible implementation, the processor is further configured to determine, based on the first key and the second key that are determined in a preset quantity of processing processes of determining the second key, a conversion relationship between the first key and the second key, obtain the first key generated by the key generator, and determine an adjusted first key based on the first key and a reverse conversion relationship corresponding to the conversion relationship, and the modulator is configured to modulate the adjusted first key to the first light source signal, to obtain the modulated optical signal.

If a key that is determined using an algorithm and that is used for communication with the receive-end device greatly differs from the first key, even though there is a fairly good association between an actually sent quantum signal and the key that is determined using the algorithm and that is used for communication with the receive-end device, probability distributions of two regular components of the actually sent quantum signal cannot meet a requirement of a modulation standard. For example, in Gaussian modulation, the probability distributions of the two regular components of the actually sent quantum signal are expected to respectively meet two independent Gaussian distributions.

According to a second aspect of the embodiments of this application, a key generation method is provided, where the method is implemented by the device provided in the first aspect.

The technical solutions provided in the embodiments of this application may have the following beneficial effects.

According to the key generation device provided in the embodiments of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by the transmit-end device. This avoids a case in which an association between the second key stored in the transmit-end device and the key used for communication with the receive-end device is relatively weak. Further, this can improve a success rate of preparing and transmitting a key, thereby avoiding system resource waste.

It should be understood that the foregoing general descriptions and the following detailed descriptions are only examples and explanatory, and do not limit this application.

BRIEF DESCRIPTION OF DRAWINGS

The accompanying drawings herein are incorporated in the specification, become a part the specification, show embodiments that are in accordance with this application, and are used with the specification to explain principles of this application. In the drawings.

Figure 1:
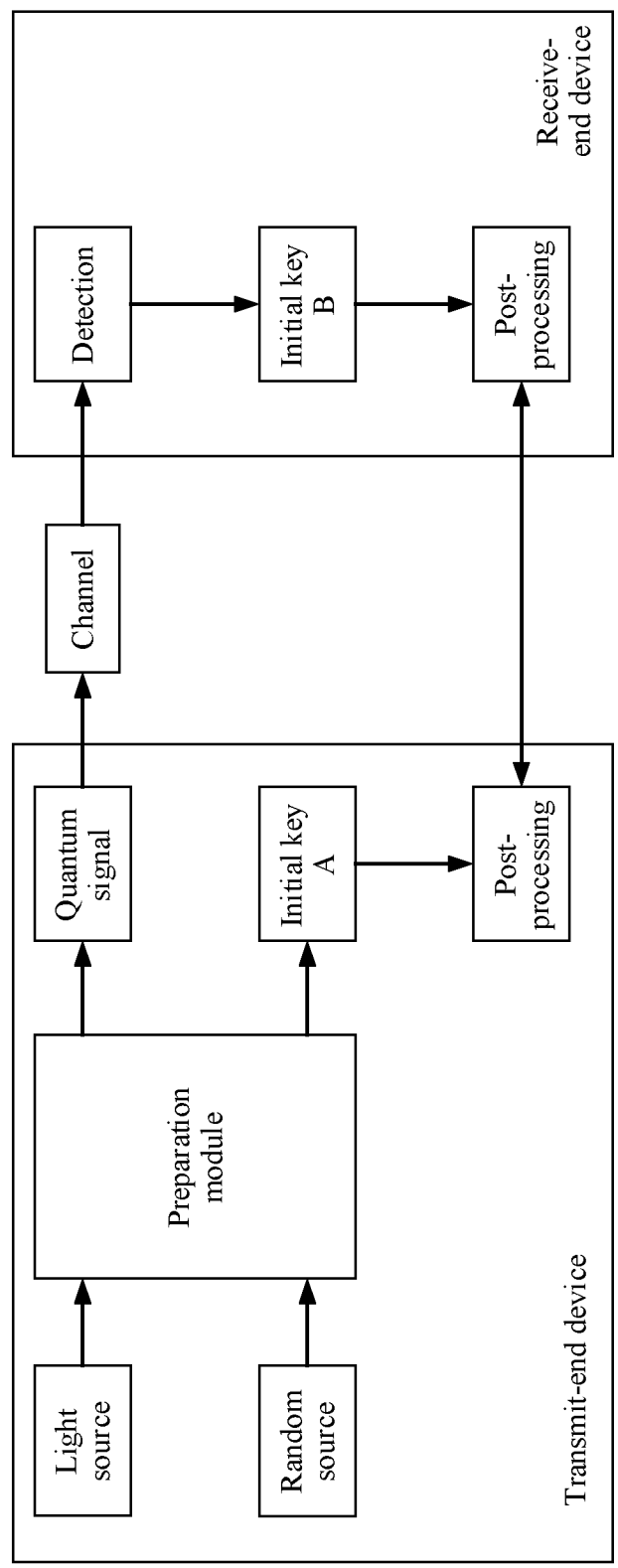
FIG. 1 is a schematic structural diagram of a CV-QKD system according to an example embodiment.

The foregoing accompanying drawings show specific embodiments of this application, and more detailed descriptions are provided below. The accompanying drawings and text descriptions are not intended to limit the scope of the idea of this application in any manner, but are intended to describe the concept of this application to a person skilled in the art with reference to particular embodiments.

DESCRIPTION OF EMBODIMENTS

Example embodiments are described in detail herein, and examples of the example embodiments are presented in the accompanying drawings. When the following descriptions relate to the accompanying drawings, unless otherwise specified, same numbers in different accompanying drawings represent a same or similar element. Implementations described in the following example embodiments do not represent all implementations consistent with this application. On the contrary, the implementations are only examples of apparatuses and methods that are described in the appended claims in detail and that are consistent with some aspects of this application.

A secure quantum communications technology nearest to practical use is a QKD technology. A function of the QKD technology is to implement unconditional secure distribution of a symmetric key on a premise that some security keys are shared. In a unidirectional QKD system, an implementation of the QKD technology is as follows. A transmit-end device encodes a coherent state of a quantum signal (the quantum signal is a signal obtained by attenuating a modulated optical signal) based on a random key. An encoded coherent state is transmitted through a channel and then detected by a receive-end device. Then the transmit-end device and the receive-end device perform post-processing through a classic channel, for example, performing measurement basis comparison, data sifting, parameter estimation (PE), data error correction (EC), and privacy amplification (PA) such that the two parties in communication finally share a same group of security keys.

From a perspective of information encoding in a spatial dimension, the QKD technology may be categorized into a discrete-variable QKD (DV-QKD) technology and a CV-QKD technology.

In the DV-QKD technology, a single photon signal is encoded to implement quantum key distribution. In the CV-QKD technology, an extremely weak coherent state is encoded to implement quantum key distribution. A key generation method and device provided in the embodiments of this application are mainly proposed for a CV-QKD system.

In the CV-QKD system, a main instrument for implementing a coherent state encoding process is a modulator. In the modulator, different modulation schemes, such as Gaussian modulation and quadrature phase-shift keying (QPSK) modulation, may be used based on a specific used protocol. There are also a plurality of types of modulators for implementing different modulation schemes, for example, a modulation component formed by cascading an intensity modulator (IM) and a phase modulator (PM). The modulator components may perform phase modulation and intensity modulation on a light source signal to prepare any coherent state in phase space. In addition, an in-phase quadrature (IQ) modulator or a dual-polarization QPSK (DPQPSK) modulator may be alternatively used to prepare any coherent state of a light source signal in one or two polarization directions.

Figure 2:
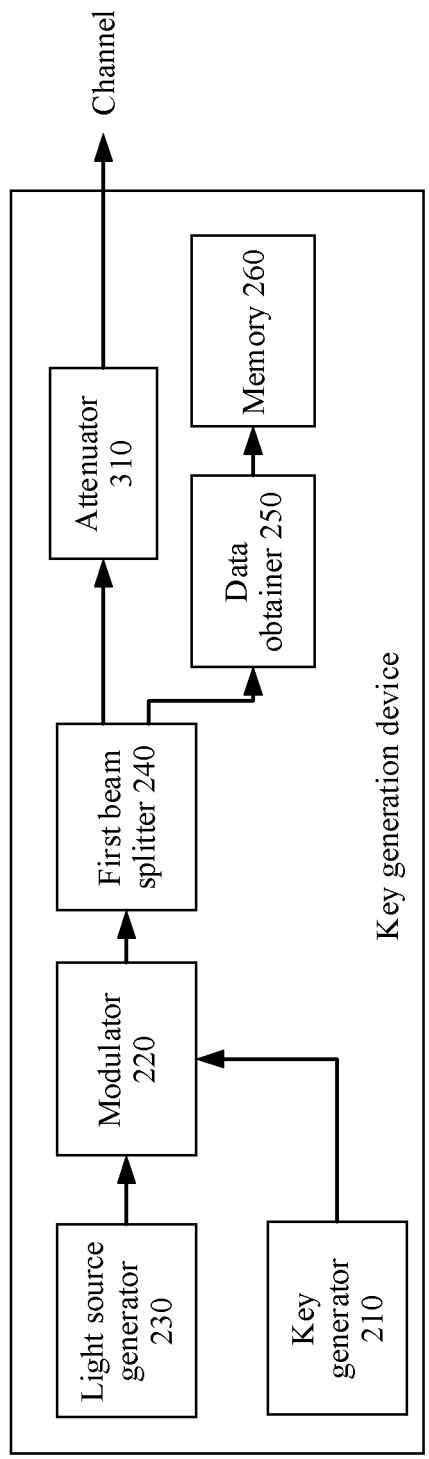
FIG. 2 is a schematic structural diagram of a key generation device according to an example embodiment.

An example embodiment of this application provides a key generation device. As shown in FIG. 2, the device may include a key generator 210, a modulator 220, a light source generator 230, a first beam splitter 240, a data obtainer 250, an attenuator 310, and a memory 260. The device may be a transmit-end device in a quantum key distribution system.

In terms of structure, the key generator 210 is connected to an electrical input end of the modulator 220, and optionally, the key generator 210 may be electrically connected to the electrical input end of the modulator 220. The light source generator 230 is connected to an optical input end of the modulator 220, and optionally, the light source generator 230 may be connected to the optical input end of the modulator 220 through an optical path. An output end of the modulator 220 is connected to an input end of the first beam splitter 240, and optionally, the output end of the modulator 220 may be connected to the input end of the first beam splitter 240 through an optical path. The first beam splitter 240 includes a first output end and a second output end. The second output end of the first beam splitter 240 is connected to an input end of the data obtainer 250, and optionally, the second output end of the first beam splitter 240 may be connected to the input end of the data obtainer 250 through an optical path. An output end of the data obtainer 250 is connected to the memory 260, and optionally, the output end of the data obtainer 250 may be electrically connected to the memory 260.

In terms of function, the key generator 210 is configured to generate a first key. The modulator 220 is configured to modulate the first key to a first light source signal, to obtain a modulated optical signal. The first beam splitter 240 is configured to split the modulated optical signal, to obtain a first sub modulated optical signal and a second sub modulated optical signal. The attenuator 310 is configured to attenuate the first sub modulated optical signal such that a quantity of photons included in each period of the first sub modulated optical signal is less than a preset value, and send an attenuated first sub modulated optical signal to a receive-end device. The data obtainer 250 is configured to obtain a second key carried in the second sub modulated optical signal, and store the second key in the memory 260.

The second key is a key obtained after a bit error occurs when the first key is modulated to the first light source signal, and the second key is a key to be used during communication with the receive-end device.

During implementation, the light source generator 230 may generate a light source signal. After entering the modulator 220, the light source signal may be modulated using the first key generated by the key generator 210, to generate the modulated optical signal, and the modulated optical signal carries information about the first key. The first key may be a random key. A quantum random number generator may be used to generate a random key, and a probability distribution of the generated random key may be made to meet a Gaussian distribution required by a CV-QKD protocol or another distribution.

In an ideal state, a quantum signal finally sent from the transmit-end device carries the first key. However, because of inaccurate modulation caused by an inherent disadvantage of a component such as an arbitrary wave generator (AWG)/analog-to-digital converter (ADC), a driver, or an IM/PM in the modulator 220, the quantum signal finally actually sent from the transmit-end device does not carry the first key. Inherent disadvantages of the components in the modulator 220 are as follows (1) From a perspective of an electrical signal output by the driver, a waveform of the electrical signal has problems such as overshoot, oscillation, and noise. There is also a problem of nonlinearity between the electrical signal and the first key. A first key in a previous period affects a subsequent modulation result to a specific extent, and the output electrical signal has a problem such as a jitter in time domain. (2) From a perspective of an optical modulation component, input impedance of the optical modulation component cannot completely match output impedance of the driver, causing inconsistent frequency responses and a relatively great impact on an alternating current signal. This finally causes an undesirable chirp parameter, an undesirable extinction ratio, and an unstable operating point.

Because of inaccurate modulation caused by the component in the modulator 220, the first key changes to an extent. As a result, data actually carried in the modulated optical signal obtained through modulation is uncertain. Therefore, a key, namely, the second key, carried in the modulated optical signal needs to be obtained. A specific method is as follows. The first beam splitter 240 may be used to split the modulated optical signal, to obtain the first sub modulated optical signal and the second sub modulated optical signal. The first sub modulated optical signal may be used as a signal to be sent to the receive-end device, to send a prepared key to the receive-end device. The second sub modulated optical signal may be used as a signal for detecting a modulation result. The second sub modulated optical signal is input into the data obtainer 250, and the data obtainer 250 is used to obtain the key carried in the second sub modulated optical signal. A beam splitting ratio of the first beam splitter 240 may be learned of. Therefore, a correspondence between light field states of the first sub modulated optical signal and the second sub modulated optical signal can be determined. The beam splitting ratio of the first beam splitter 240 may be set to 50:50. If the beam splitting ratio is 50:50, the first sub modulated optical signal and the second sub modulated optical signal have same intensity information and same phase information. A key carried in the first sub modulated optical signal is related to a light field state. Therefore, there is a relatively strong association between the key carried in the first sub modulated optical signal and the key that is carried in the second sub modulated optical signal and that is obtained using the data obtainer 250. The association means that the key carried in the first sub modulated optical signal and the key carried in the second sub modulated optical signal are in a one-to-one correspondence or even have a linear relationship. Finally, after obtaining the key carried in the second sub modulated optical signal, the data obtainer 250 stores the key in the local transmit-end device for a subsequent post-processing operation such that the transmit-end device finally shares a same group of security keys with the receive-end device.

In addition, it should be noted that in the key generation device, an optical path for transmitting an optical signal may be a medium that can transmit light, for example, an optical fiber. Preferably, a polarization maintaining optical fiber may be selected. If the polarization maintaining optical fiber is used, it can be ensured that a polarization state of an optical signal is unchanged in a transmission process. If the polarization state of the optical signal is changed, a coherent state of the optical signal is affected, and finally data carried in the optical signal is also changed.

During implementation, the attenuator 310 may be used to attenuate the first sub modulated optical signal, to attenuate, to an extremely weak coherent state required by the CV-QKD protocol, a laser beam that has relatively strong power and that is output by the light source generator 230 such as a laser. In an embodiment, a quantity of photons included in each period is less than 100. It should be noted that in a CV-QKD system, a light source signal may be first modulated and then attenuated, or a light source signal may be first attenuated and then modulated. However, in this embodiment of this application, preferably, the light source signal is first modulated and then attenuated. Before the light source signal is attenuated, power of the light source signal is still relatively strong and is not prone to be affected by quantum noise. Therefore, precision of measuring the light source signal by the data obtainer 250 is relatively high. Moreover, different from the modulator 220, the beam splitter and the attenuator 310 both are common energy attenuation components and do not exert an unpredictable impact on data carried in an optical signal.

The second key obtained by the data obtainer 250 is converted into a security key after post-processing (such as data sifting, PE, data EC, and PA) is performed on the second key. The security key may be applied to secure communication. At an encryption stage, a segment of to-be-encrypted information may be encrypted using the security key. For example, a security key a and to-be-encrypted information b are encrypted using a function y=f(a, b), to obtain ciphertext y. At a decryption stage, the receive-end device receives the first sub modulated optical signal in this embodiment in advance, detects the first sub modulated optical signal, to obtain an electrical signal corresponding to the first sub modulated optical signal, determines, using a preset algorithm, a key carried in the electrical signal, and performs same post-processing on the key to obtain the security key a. The receive-end device can restore the ciphertext y to an unencrypted form using the security key a and an inverse function of the function y=f(a, b), to obtain the information b. Certainly, there are other manners of performing encryption using a security key. Examples are not given one by one herein.

Optionally, the key generation device provided in this embodiment of this application may be applied to an associated local oscillator (LO) system, or may be applied to a locally LO system.

CV-QKD systems may be categorized into two types based on a location at which an LO is generated. A CV-QKD system in which the LO is generated in the transmit-end device is referred to as an associated LO system, and a CV-QKD system in which the LO is generated in the receive-end device is referred to as a locally LO system. The LO may be the light source signal in this embodiment of this application, and is used with the quantum signal to perform key detection.

According to the key generation device provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by the transmit-end device. This avoids a case in which an association between the key stored in the transmit-end device and the key used for communication with the receive-end device is relatively weak. Further, this can improve a success rate of preparing and transmitting a key, thereby avoiding system resource waste.

Figure 3:
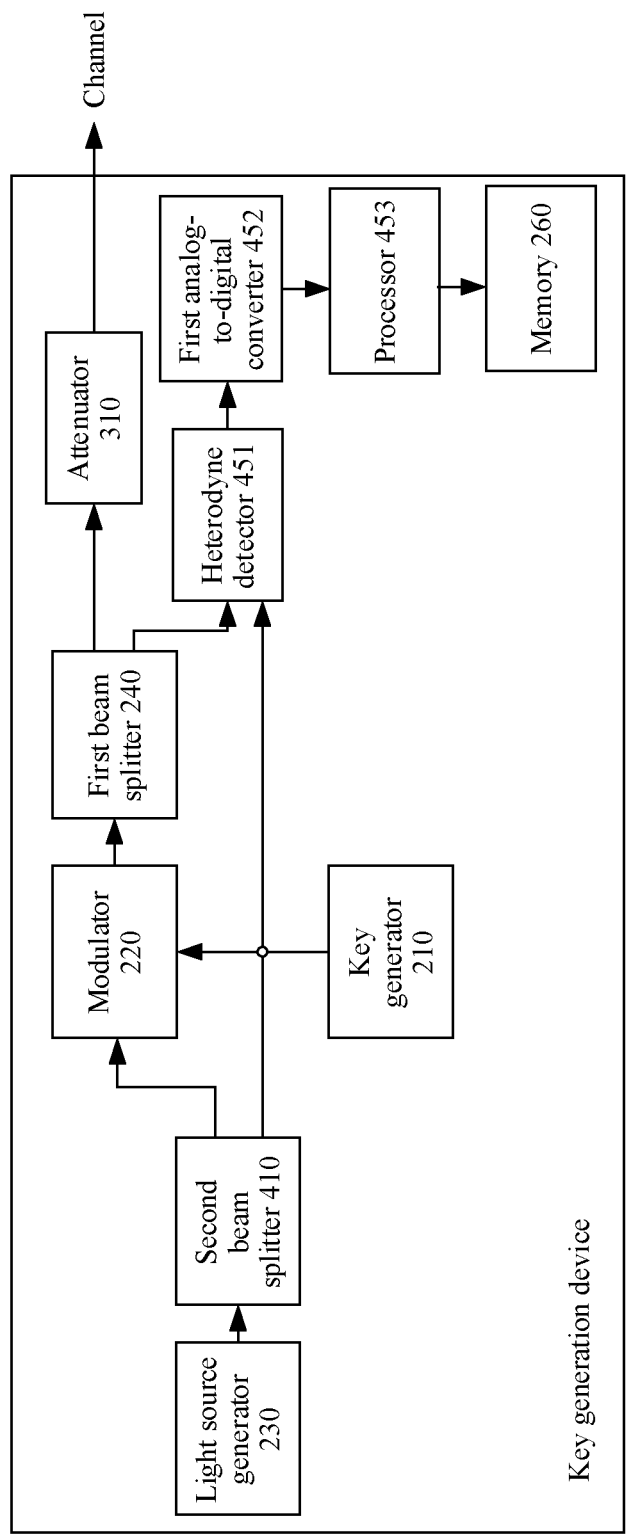
FIG. 3 is a schematic structural diagram of a key generation device according to an example embodiment.

An example embodiment of this application provides a key generation device. As shown in FIG. 3, the device may include a key generator 210, a modulator 220, a light source generator 230, a first beam splitter 240, an attenuator 310, a data obtainer 250, and a memory 260. The key generation device may further include a second beam splitter 410. The data obtainer 250 includes a heterodyne detector 451, a first analog-to-digital converter 452, and a processor 453.

In terms of structure, the key generator 210 is connected to an electrical input end of the modulator 220, and optionally, the key generator 210 may be electrically connected to the electrical input end of the modulator 220. An output end of the modulator 220 is connected to an input end of the first beam splitter 240, and optionally, the output end of the modulator 220 may be connected to the input end of the first beam splitter 240 through an optical path. The first beam splitter 240 includes a first output end and a second output end. An input end of the second beam splitter 410 is connected to the light source generator 230, and optionally, the input end of the second beam splitter 410 may be connected to the light source generator 230 through an optical path. The second output end of the first beam splitter 240 is connected to a first input end of the heterodyne detector 451, and optionally, the second output end of the first beam splitter 240 may be connected to the first input end of the heterodyne detector 451 through an optical path. A first output end of the second beam splitter 410 is connected to an optical input end of the modulator 220, and optionally, the first output end of the second beam splitter 410 may be connected to the optical input end of the modulator 220 through an optical path. A second output end of the second beam splitter 410 is connected to a second input end of the heterodyne detector 451, and optionally, the second output end of the second beam splitter 410 may be connected to the second input end of the heterodyne detector 451 through an optical path. An output end of the heterodyne detector 451 is connected to an input end of the first analog-to-digital converter 452, and optionally, the output end of the heterodyne detector 451 may be electrically connected to the input end of the first analog-to-digital converter 452. An output end of the first analog-to-digital converter 452 is connected to a first input end of the processor 453, and optionally, the output end of the first analog-to-digital converter 452 may be electrically connected to the first input end of the processor 453. A first output end of the processor 453 is connected to the memory 260, and optionally, the first output end of the processor 453 may be electrically connected to the memory 260.

In terms of function, the second beam splitter 410 is configured to split an original light source signal generated by the light source generator, to obtain a first light source signal and a second light source signal. The modulator 220 is configured to modulate a first key to the first light source signal, to obtain a modulated optical signal. The first beam splitter 240 is configured to split the modulated optical signal, to obtain a first sub modulated optical signal and a second sub modulated optical signal. The attenuator 310 is configured to attenuate the first sub modulated optical signal such that a quantity of photons included in each period of the first sub modulated optical signal is less than a preset value, and send an attenuated first sub modulated optical signal to a receive-end device. The heterodyne detector 451 is configured to detect the second sub modulated optical signal and the second light source signal, to obtain a first analog electrical signal that carries regular component information of the second sub modulated optical signal. The first analog-to-digital converter 452 is configured to perform analog-to-digital conversion on the first analog electrical signal to obtain a first digital electrical signal that carries the regular component information of the second sub modulated optical signal, and send the first digital electrical signal to the processor 453. The processor 453 is configured to obtain, based on the regular component information of the second sub modulated optical signal and a preset first data obtaining algorithm, a second key carried in the second sub modulated optical signal. The memory 260 is configured to store the second key.

The second key is a key obtained after a bit error occurs when the first key is modulated to the first light source signal, and the second key is a key to be used during communication with the receive-end device.

In a specific application scenario, components that may be used in the key generation device provided in this embodiment and functions of the components are first described below.

(1) A laser generates a continuous or pulse-type linearly polarized narrow-linewidth laser beam.

(2) A beam splitter splits an input optical signal into two signals for output. Optionally, a polarization maintaining beam splitter may be selected.

(3) A modulator modulates an optical signal. The modulator may include a modulator obtained by cascading an IM and a PM, a QPSK modulator, or the like.

(4) A quantum random number generator generates a random key based on a required modulation code type. Specifically, a random number is obtained from the quantum random number generator, and then the random key is generated based on the required modulation code type.

(5) A delayer may perform a delay operation on an input optical signal, to match a difference between times at which signals in other optical paths arrive at a same component.

(6) A heterodyne detector (HD) may detect an input optical signal and output an analog electrical signal that carries information about two regular components of the optical signal.

(7) An ADC converts an analog electrical signal into a digital electrical signal.

(8) An attenuator may attenuate intensity of an optical signal input into the attenuator.

Figure 4:
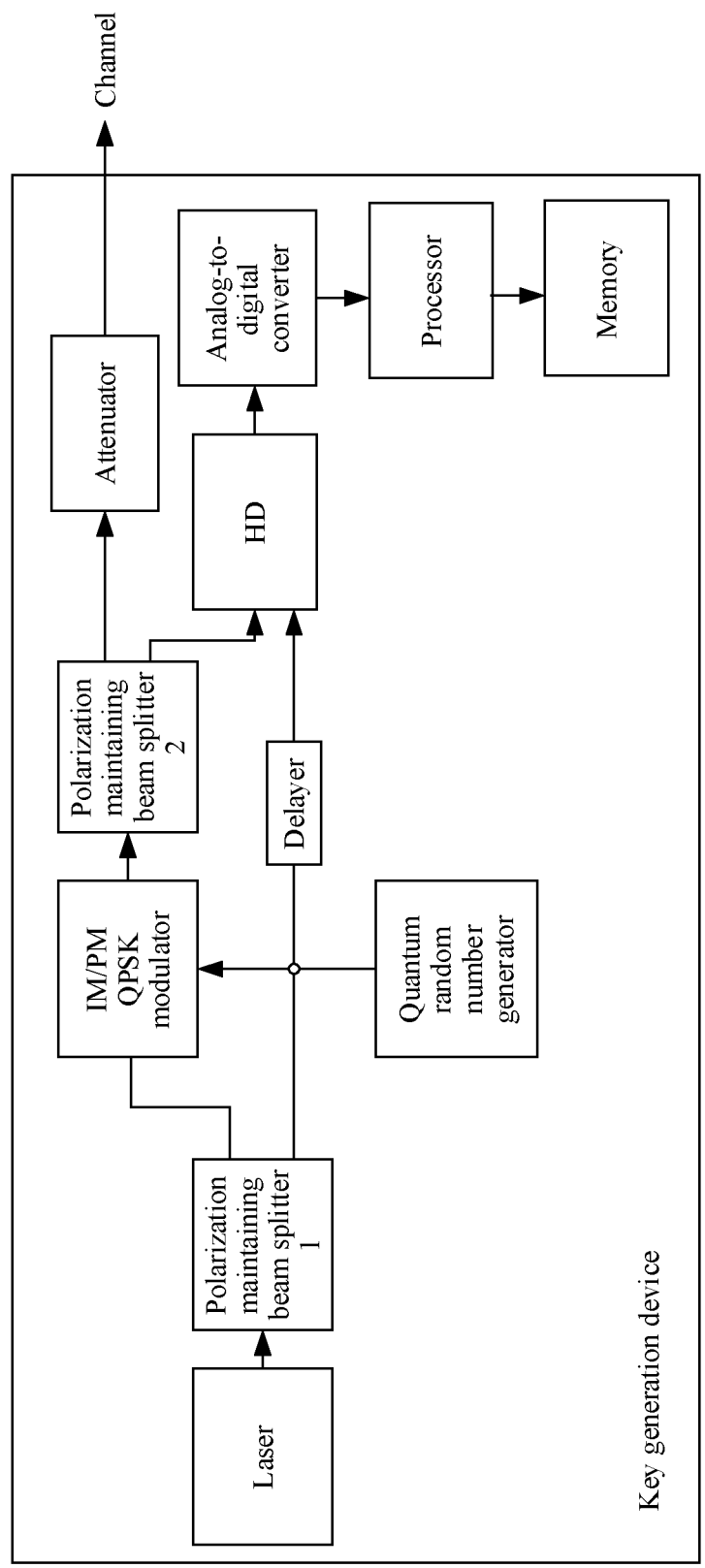
FIG. 4 is a schematic structural diagram of a key generation device according to an example embodiment.

FIG. 4 is a schematic structural diagram of a key generation device constructed using the foregoing components. A working procedure of internal components of the key generation device is as follows.

(1) A laser generates a continuous linearly polarized narrow-linewidth laser beam and inputs the laser beam into a pulse generator, to generate an optical pulse having a high extinction ratio. A duty cycle of the pulse may be controlled within 1% to 99%. For example, a system repetition frequency is 100 megahertz (MHz), and the duty cycle of the generated pulse is set to 50%. In this case, an envelope of an optical pulse obtained by the pulse generator by chopping the laser beam is a waveform of a 5 ns-wide rectangular wave. However, if the laser beam is not input into the pulse generator to generate an optical pulse, when the laser beam is input into a modulator, a modulation operation on the laser beam naturally causes the laser beam to generate different periods. However, a disadvantage of this method is that an obtained signal is not a perfect rectangular wave. As a result, when modulated data in a previous period and modulated data in a current period are different, a modulation component cannot perform instantaneous conversion, but a conversion time exists. A modulated signal in the conversion time is inaccurate. Therefore, in this embodiment, preferably, the laser beam is chopped to generate an optical pulse, and the optical pulse may be used as the original light source signal in this embodiment.

(2) The optical pulse is divided into two signals using a polarization maintaining beam splitter 1. One signal may be used as a first light source signal, and the other signal may be used as a second light source signal.

(3) The modulator is used to modulate a random key to the first light source signal.

(4) A polarization maintaining beam splitter 2 splits a modulated optical signal, to obtain a first sub modulated optical signal and a second sub modulated optical signal, and sends, to the receive-end device through a first output end, a first sub modulated optical signal that is attenuated by an attenuator and that meets an extremely weak coherent state required by a CV-QKD protocol. The polarization maintaining beam splitter 1 splits an original light source signal, to obtain the first light source signal and the second light source signal. An HD detects the second sub modulated optical signal and the second light source signal, and the second sub modulated optical signal and the second light source signal arrive at the HD at a same time. To enable the second sub modulated optical signal and the second light source signal to arrive at the HD at a same time, a delay operation may be performed on the second light source signal using a delayer. It should be noted that if the laser beam generated by the laser is continuous and has a narrow linewidth and a relatively long coherence time, the HD can obtain a relatively precise measurement result without setting the delayer to perform a delay operation.

(5) The HD detects the second sub modulated optical signal and the second light source signal, to obtain a first analog electrical signal that carries regular component information of the second sub modulated optical signal. An ADC performs sampling to obtain a first digital electrical signal that carries the regular component information of the second sub modulated optical signal. A processor may obtain a second key based on the regular component information carried in the first digital electrical signal and a preset first data obtaining algorithm. The data may be used as data, of a transmit-end device, to be subsequently used in post-processing required by the CV-QKD protocol. It should be noted that after the structure of the key generation device provided in this embodiment is described, the preset first data obtaining algorithm is described in detail.

Figure 5:
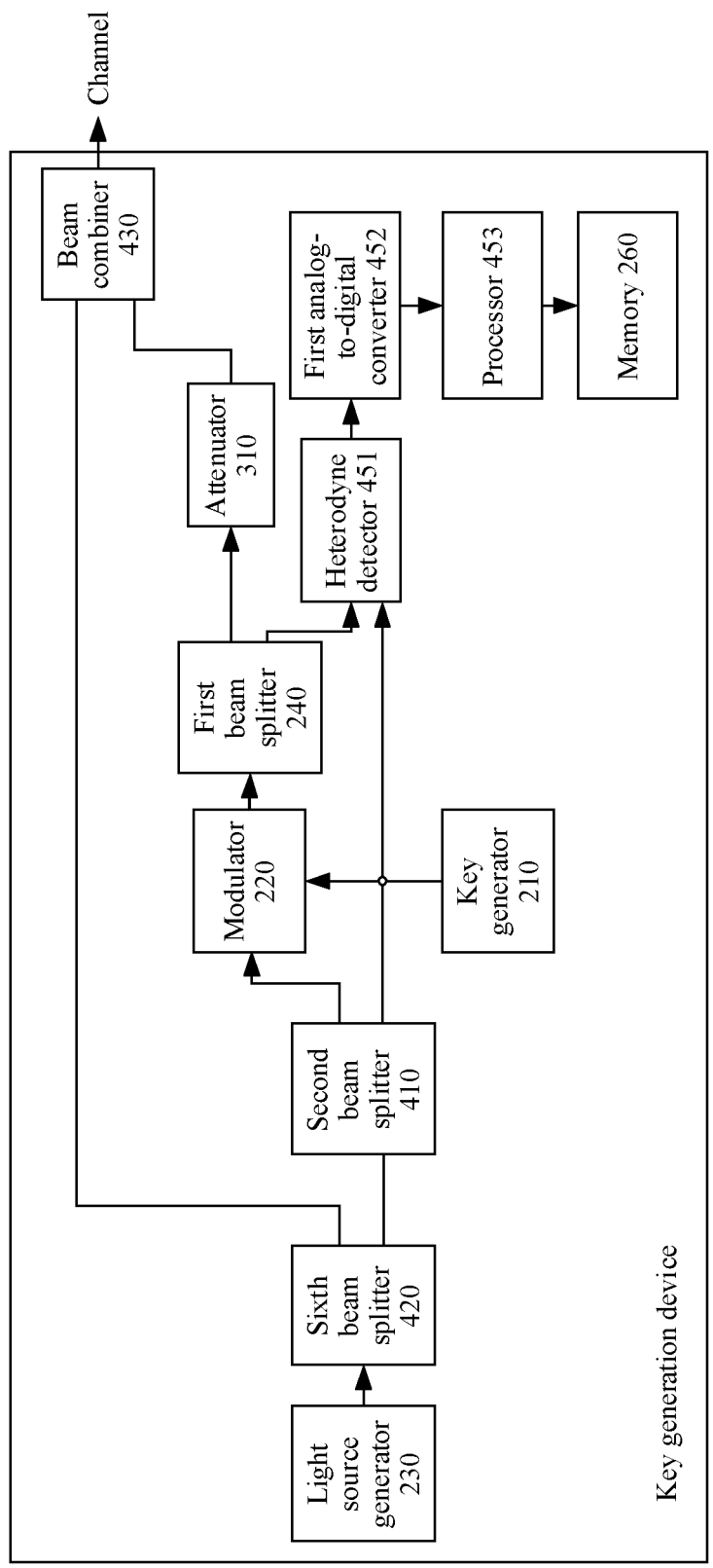
FIG. 5 is a schematic structural diagram of a key generation device according to an example embodiment.

Optionally, the key generation device provided in FIG. 3 may be applied to a locally LO system. The locally LO system does not require the transmit-end device to provide an LO (a light source signal) to the receive-end device. However, if the key generation device provided in this embodiment needs to be applied to an associated LO system, a sixth beam splitter 420 and a beam combiner 430 need to be further added based on the components provided in FIG. 3. For a structure of a key generation device obtained after the sixth beam splitter 420 and the beam combiner 430 are added, refer to FIG. 5. Optionally, the beam combiner may be a polarization maintaining beam combiner. An input end of the sixth beam splitter 420 is connected to the light source generator 230 through an optical path, a first output end of the sixth beam splitter 420 is connected to a first input end of the beam combiner through an optical path, and a second output end of the sixth beam splitter 420 is connected to the input end of the second beam splitter 410 through an optical path, and an output end of the attenuator 310 is connected to a second input end of the beam combiner through an optical path.

The sixth beam splitter 420 is configured to split the light source signal to obtain two signals. One signal is input as an LO into the beam combiner, and is combined with a quantum signal, and the other signal is used as a light source signal for preparing a quantum signal that carries a key. The beam combiner is configured to combine the LO and the quantum signal that carries a key.

Optionally, if the transmit-end device uses a dual-polarization modulation scheme, a light source signal needs to be independently modulated in two polarization directions. Therefore, the structure provided in this embodiment may be used for each of key generation instruments in the two polarization directions.

During implementation, for example, a key for modulation is $A_1$ in a first polarization direction, and a key for modulation is $A_2$ in a second polarization direction. The data obtainer is used to obtain a modulated optical signal in the first polarization direction, to obtain a key $B_1$. The data obtainer is used to obtain a modulated optical signal in the second polarization direction, to obtain a key $B_2$. The key $B_1$ and the key $B_2$ are separately stored and are used as keys for communication with the receive-end device.

The preset first data obtaining algorithm is described below in detail.

Optionally, the processor is configured to obtain the second key based on the regular component information of the second sub modulated optical signal, detection efficiency of the heterodyne detector, intensity information of the second light source signal, a beam splitting ratio of the first beam splitter, transmittance of the attenuator, and the preset first data obtaining algorithm.

Optionally, the preset first data obtaining algorithm may be $$x_A = \frac{1}{\eta_D} \sqrt{\frac{2\eta_{310} k_{240}}{I_{LO}} \frac{V_A + 1}{V_A - 1}} X, \quad \text{(Formula 1)}$$

$$p_A = -\frac{1}{\eta_D} \sqrt{\frac{2\eta_{310} k_{240}}{I_{LO}} \frac{V_A + 1}{V_A - 1}} P,$$

where $\eta_D$ is the detection efficiency of the heterodyne detector, $I_{LO}$ is the intensity information of the second light source signal, $k_{240}$ is the beam splitting ratio of the first beam splitter 240, $\eta_{310}$ is the transmittance of the attenuator 310, $V_A$ is an equivalent variance of an entangled state, X and P are the regular component information of the second sub modulated optical signal, and $x_A$ and $p_A$ constitute the second key. For a specific deduction process, refer to the descriptions below.

A quantum signal that carries key information is finally sent from a transmit end, and an analog-to-digital converter collects an analog electrical signal converted from a regular component of a modulated optical signal. Therefore, it is assumed that the preset first data obtaining algorithm mainly includes two steps.

I. A conversion relationship between the analog electrical signal collected by the analog-to-digital converter and the regular component.

II. A regular component of an optical signal that is input through the first input end of the heterodyne detector 451 is converted into a key carried in a quantum signal sent by the transmit-end device.

Two algorithm ideas are described herein based on the foregoing view. FIG. 3 is used as an example. In a first algorithm, it is assumed that the following parameters are already known the detection efficiency $\eta_D$ of the heterodyne detector 451, the intensity information $I_{LO}$ of the second light source signal, a ratio $k_{240}$ of intensity information of the first sub modulated optical signal to intensity information of the second sub modulated optical signal, the transmittance $\eta_{310}$ for attenuating the first sub modulated optical signal when the first sub modulated optical signal is sent, and the equivalent variance $V_A$ (where a value of $V_A$ is stipulated in a protocol) of the entangled state (two-mode squeezed state) of the transmit-end device. It is assumed that $x_A$ and $p_A$ constitute the second key, and that data collected by the first analog-to-digital converter 452 is $x_{ADC}$ and $p_{ADC}$. It can be reversely deduced, according to a sampling rule of the first analog-to-digital converter 452, that regular component information that is of the second sub modulated optical signal and that is output by the heterodyne detector 451 is X and P. Therefore, it can be deduced that average values of two regular components of a quantum signal sent by the attenuator 310 to a channel are shown in Formula 2

$$x_{310} = \frac{2}{\eta_D} \sqrt{\frac{\eta_{310} k_{240}}{I_{LO}}} X, \text{ and } p_{310} = \frac{2}{\eta_D} \sqrt{\frac{\eta_{310} k_{240}}{I_{LO}}} P. \quad \text{(Formula 2)}$$

Keys for communication with the receive-end device are shown in Formula 3

$$x_A = f_x(x_{310}, p_{310}), \text{ and } p_A = f_p(x_{310}, p_{310}) \quad \text{(Formula 3)}.$$

In Gaussian modulation, the functions in the foregoing formula are specifically shown in Formula 4

$$x_A = \sqrt{\frac{1}{2}\frac{V_A+1}{V_A-1}}\, x_{310} = \pm\frac{1}{\eta_D}\sqrt{\frac{2\eta_{310}k_{240}}{I_{LO}}\frac{V_A+1}{V_A-1}}\, X,\text{ and}$$

$$p_A = -\sqrt{\frac{1}{2}\frac{V_A+1}{V_A-1}}\, p_{310} = \pm\frac{1}{\eta_D}\sqrt{\frac{2\eta_{310}k_{240}}{I_{LO}}\frac{V_A+1}{V_A-1}}\, P. \qquad \text{(Formula 4)}$$

It should be noted that in an embodiment, $x_A$ and $p_A$ both may be positive numbers or both may be negative numbers, or one of $x_A$ and $p_A$ may be a positive number, and the other one is a negative number. There are four representation manners in total. This depends on extra phase difference definitions of different beam splitters.

A concept of the first algorithm is that transmittance of passive components such as a beam splitter are basically constant and may be measured in advance, and an energy change relationship of a laser beam is simple when the laser beam passes through the passive components.

A second algorithm derives from the first algorithm. In the first algorithm, proportion coefficients of many passive components need to be known, and strength information of an optical signal needs to be measured. Essentially, these parameters are used for determining a ratio of intensity information of an optical signal entering the heterodyne detector 451 to intensity information of a quantum signal sent by the attenuator 310 to a channel. In addition, in the first algorithm, it is assumed that there is a linear relationship between the two pieces of intensity information. Therefore, a quantum HD having comprehensive detection efficiency of $\eta_{QD}$ may be directly connected to the channel, and a calibration process is performed. It is assumed that output results of the quantum HD are $x_{het}$ and $p_{het}$, and it is assumed that the following relationship exists between the output results and X and P that are obtained through detection by the heterodyne detector 451

$$x_{het} = \frac{\sqrt{\eta_{QD}}}{\sqrt{2}}k_x X + \hat{N}_x,\text{ and} \qquad \text{(Formula 5)}$$

$$p_{het} = \frac{\sqrt{\eta_{QD}}}{\sqrt{2}}k_p P + \hat{N}_p,$$

where $\hat{N}_x$ and $\hat{N}_p$ represent vacuum noise, and are random variables. Specifically, in the second algorithm, $k_x$ and $k_p$ may be deduced in the following two manners.

Average Value Method.

It is assumed that in a calibration process, an average value of sent data is not zero. Considering that an average value of the vacuum noise is zero, $$k_x = \frac{\sqrt{\eta_{QD}}}{\sqrt{2}}\frac{\langle X\rangle}{\langle x_{het}\rangle}, k_p = \frac{\sqrt{\eta_{QD}}}{\sqrt{2}}\frac{\langle P\rangle}{\langle p_{het}\rangle}, \qquad \text{(Formula 6)}$$

where $\langle\ \rangle$ represents calculating an average value of a segment of data.

Variance Method

It is assumed that in a calibration process, an average value of sent data is zero (or very approximate to zero). In this case, a variance statistics collection manner may be used for calculation $$\Delta x_{het}^2 = k_x^2 \frac{\eta_{QD}}{2}\Delta X^2 + 1,\ \Delta p_{het}^2 = k_p^2 \frac{\eta_{QD}}{2}\Delta P^2 + 1,\text{ and} \qquad \text{(Formula 7)}$$

$$k_x = \sqrt{2\frac{\Delta x_{het}^2 - 1}{\eta_{QD}\Delta X^2}},\ k_p = \sqrt{2\frac{\Delta p_{het}^2 - 1}{\eta_{QD}\Delta P^2}}, \qquad \text{(Formula 8)}$$

where a variance of vacuum noise may be defined as 1, $\Delta X^2$ and $\Delta P^2$ are statistical variances of het X and P, and $\Delta x_{het}^2$ and $\Delta p_{het}^2$ are statistical variances of $X_{het}$ and $p_{het}$.

After the proportion coefficients $k_x$ and $k_p$ are determined, it can be deduced, using a detection result of the heterodyne detector 451, that $x_{310}=k_x X$, and $p_{310}=k_p P$, thereby learning that the key used for communication with the receive-end device is $$x_A = f_x(x_{310}, p_{310})\text{ and }p_A = f_p(x_{310}, p_{310}) \qquad \text{(Formula 9)}.$$

In Gaussian modulation, the functions in the foregoing formula are specifically $$x_A = \sqrt{\frac{1}{2}\frac{V_A+1}{V_A-1}}\, x_{310} = \sqrt{\frac{1}{2}\frac{V_A+1}{V_A-1}}\,\frac{\sqrt{\eta_{QD}}}{\sqrt{2}}\frac{\langle X\rangle}{\langle x_{het}\rangle}A,\text{ and} \qquad \text{(Formula 10)}$$

$$p_A = -\sqrt{\frac{1}{2}\frac{V_A+1}{V_A-1}}\, p_{310} = -\sqrt{\frac{1}{2}\frac{V_A+1}{V_A-1}}\,\frac{\sqrt{\eta_{QD}}}{\sqrt{2}}\frac{\langle P\rangle}{\langle p_{het}\rangle}P\text{ or}$$

$$x_A = \sqrt{\frac{1}{2}\frac{V_A+1}{V_A-1}}\, x_{310} = \pm\sqrt{\frac{1}{2}\frac{V_A+1}{V_A-1}}\,\sqrt{2\frac{\Delta x_{het}^2 - 1}{\eta_{QD}\Delta X^2}}\, X, \qquad \text{(Formula 11)}$$

and $$p_A = -\sqrt{\frac{1}{2}\frac{V_A+1}{V_A-1}}\, p_{310} = \pm\sqrt{\frac{1}{2}\frac{V_A+1}{V_A-1}}\,\sqrt{2\frac{\Delta p_{het}^2 - 1}{\eta_{QD}\Delta P^2}}\, P.$$

It should be noted that in an embodiment, $x_A$ and $p_A$ both may be positive numbers or both may be negative numbers, or one of $x_A$ and $p_A$ may be a positive number, and the other one is a negative number. There are four representation manners in total. The preset first data obtaining algorithm provided above is used to convert a detection result for the second sub modulated optical signal into the key used for communication with the receive-end device. In a possible case, the first key and the detection result for the second sub modulated optical signal may be fitted based on the first key, the detection result for the second sub modulated optical signal, and another algorithm, to obtain the key used for communication with the receive-end device.

If the key, determined using the algorithm, for communication with the receive-end device greatly differs from the first key, the system needs to be recalibrated, or even the second key generated in a current round is discarded.

In this embodiment, before the modulated optical signal is attenuated to a quantum signal, the modulated optical signal is first split, and the HD is used to detect the second sub modulated optical signal obtained through splitting. The second sub modulated optical signal entering the HD and the quantum signal entering the channel have a same modulation feature and vary only in a linear attenuation degree in terms of intensity. Therefore, there is a fairly good association between the detection result of the HD and an actually sent quantum signal. The key carried in the second sub modulated light can be obtained using the preset first data obtaining algorithm and by considering an optical-to-electrical conversion coefficient and an attenuation coefficient in a detection process as factors affecting the key. In this case, there is a very good association between the key carried in the second sub modulated light and a key carried in the actually sent quantum signal.

According to the key generation device provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by the transmit-end device. This avoids a case in which an association between the second key stored in the transmit-end device and the key used for communication with the receive-end device is relatively weak. Further, this can improve a success rate of preparing and transmitting a key, thereby avoiding system resource waste.

Figure 6:
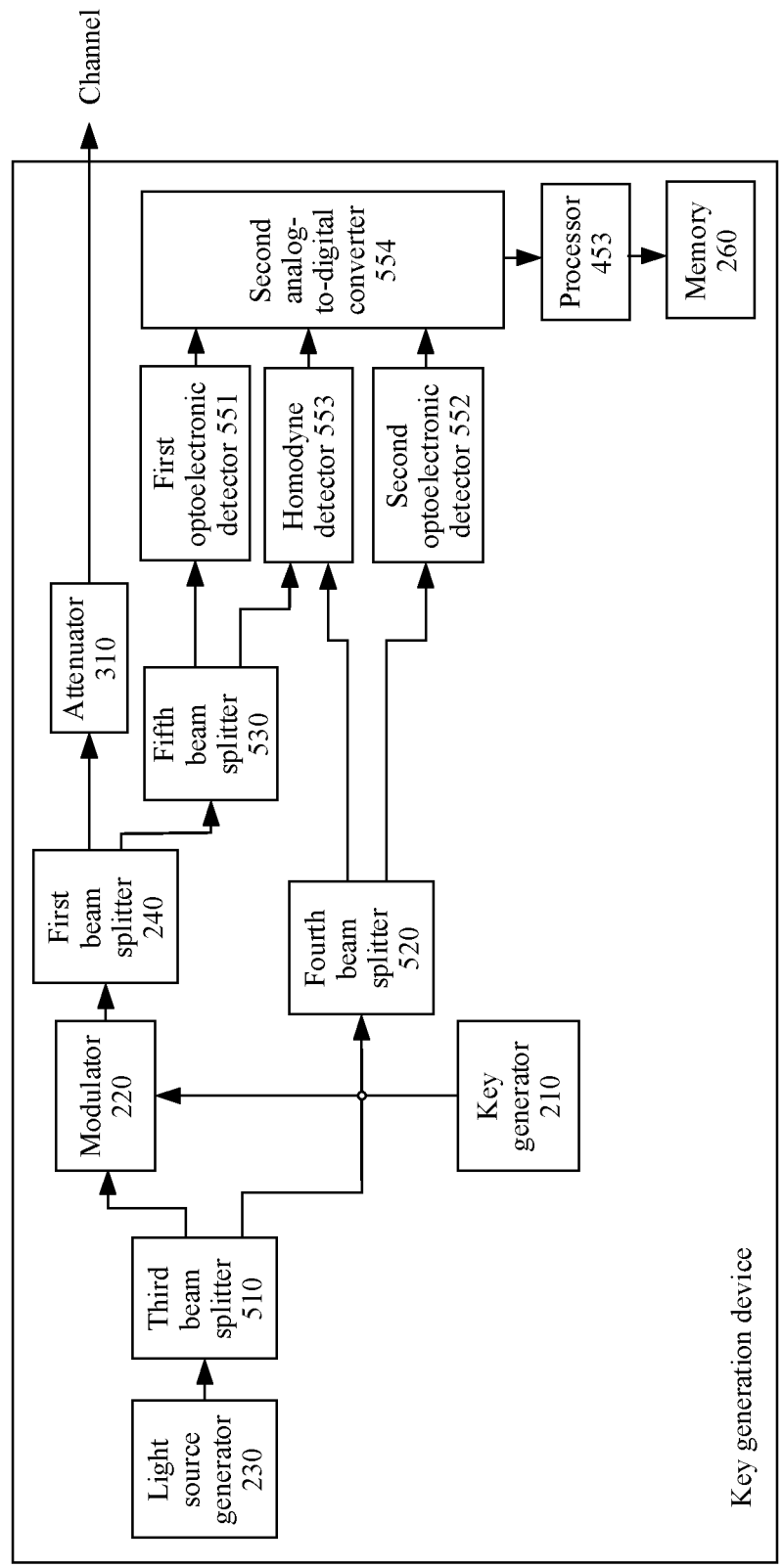
FIG. 6 is a schematic structural diagram of a key generation device according to an example embodiment.

An example embodiment of this application provides a key generation device. As shown in FIG. 6, the device may include a key generator 210, a modulator 220, a light source generator 230, a first beam splitter 240, an attenuator 310, a data obtainer 250, and a memory 260. The device may further include a third beam splitter 510, a fourth beam splitter 520, and a fifth beam splitter 530. The data obtainer 250 may specifically include a first optoelectronic detector 551, a second optoelectronic detector 552, a homodyne detector 553, a second analog-to-digital converter 554, and a processor 453.

In terms of structure, the key generator 210 is connected to an electrical input end of the modulator 220, and optionally, the key generator 210 may be electrically connected to the electrical input end of the modulator 220. An output end of the modulator 220 is connected to an input end of the first beam splitter 240, and optionally, the output end of the modulator 220 may be connected to the input end of the first beam splitter 240 through an optical path. The first beam splitter 240 includes a first output end and a second output end. An input end of the third beam splitter 510 is connected to the light source generator 230, and optionally, the input end of the third beam splitter 510 may be connected to the light source generator 230 through an optical path. A first output end of the third beam splitter 510 is connected to an optical input end of the modulator 220, and optionally, the first output end of the third beam splitter 510 may be connected to the optical input end of the modulator 220 through an optical path. The second output end of the first beam splitter 240 is connected to an input end of the fifth beam splitter 530, and optionally, the second output end of the first beam splitter 240 may be connected to the input end of the fifth beam splitter 530 through an optical path. A first output end of the fifth beam splitter 530 is connected to an input end of the first optoelectronic detector 551, and optionally, the first output end of the fifth beam splitter 530 may be connected to the input end of the first optoelectronic detector 551 through an optical path. An output end of the first optoelectronic detector 551 is connected to a first input end of the second analog-to-digital converter 554, and optionally, the output end of the first optoelectronic detector 551 may be electrically connected to the first input end of the second analog-to-digital converter 554. A second output end of the fifth beam splitter 530 is connected to a first input end of the homodyne detector 553, and optionally, the second output end of the fifth beam splitter 530 may be connected to the first input end of the homodyne detector 553 through an optical path. An output end of the homodyne detector 553 is connected to a second input end of the second analog-to-digital converter 554, and optionally, the output end of the homodyne detector 553 may be electrically connected to the second input end of the second analog-to-digital converter 554. A second output end of the third beam splitter 510 is connected to an input end of the fourth beam splitter 520, and optionally, the second output end of the third beam splitter 510 may be connected to the input end of the fourth beam splitter 520 through an optical path. A first output end of the fourth beam splitter 520 is connected to a second input end of the homodyne detector 553, and optionally, the first output end of the fourth beam splitter 520 may be connected to the second input end of the homodyne detector 553 through an optical path. A second output end of the fourth beam splitter 520 is connected to an input end of the second optoelectronic detector 552, and optionally, the second output end of the fourth beam splitter 520 may be connected to the input end of the second optoelectronic detector 552 through an optical path. An output end of the second optoelectronic detector 552 is connected to a third input end of the second analog-to-digital converter 554, and optionally, the output end of the second optoelectronic detector 552 may be electrically connected to the third input end of the second analog-to-digital converter 554. An output end of the second analog-to-digital converter 554 is connected to a first input end of the processor 453, and optionally, the output end of the second analog-to-digital converter 554 may be electrically connected to the first input end of the processor 453. A first output end of the processor 453 is connected to the memory 260, and optionally, the first output end of the processor 453 may be electrically connected to the memory 260.

In terms of function, the modulator 220 is configured to modulate a first key to a first light source signal, to obtain a modulated optical signal. The first beam splitter 240 is configured to split the modulated optical signal, to obtain a first sub modulated optical signal and a second sub modulated optical signal. The third beam splitter 510 is configured to split an original light source signal generated by the light source generator, to obtain the first light source signal and a second light source signal. The fifth beam splitter 530 is configured to split the second sub modulated optical signal to obtain a third sub modulated optical signal and a fourth sub modulated optical signal. The first optoelectronic detector 551 is configured to detect the third sub modulated optical signal, to obtain a second analog electrical signal that carries intensity information of the third sub modulated optical signal. The fourth beam splitter 520 is configured to split the second light source signal, to obtain a first sub light source signal and a second sub light source signal. The attenuator 310 is configured to attenuate the first sub modulated optical signal such that a quantity of photons included in each period of the first sub modulated optical signal is less than a preset value, and send an attenuated first sub modulated optical signal to a receive-end device. The homodyne detector 553 is configured to detect the first sub light source signal and the fourth sub modulated optical signal, to obtain a third analog electrical signal that carries intensity information of a signal obtained after coherence between the first sub light source signal and the fourth sub modulated optical signal. The second optoelectronic detector 552 is configured to detect the second sub light source signal, to obtain a fourth analog electrical signal that carries intensity information of the second sub light source signal. The second analog-to-digital converter 554 is configured to perform analog-to-digital conversion on the second analog electrical signal to obtain a second digital electrical signal that carries the intensity information of the third sub modulated optical signal, perform analog-to-digital conversion on the third analog electrical signal to obtain a third digital electrical signal that carries the intensity information of the signal obtained after the coherence between the first sub light source signal and the fourth sub modulated optical signal, and perform analog-to-digital conversion on the fourth analog electrical signal to obtain a fourth digital electrical signal that carries the intensity information of the second sub light source signal. The processor 453 is configured to obtain a second key based on the intensity information of the third sub modulated optical signal, the intensity information of the signal obtained after the coherence between the first sub light source signal and the fourth sub modulated optical signal, the intensity information of the second sub light source signal, and a preset second data obtaining algorithm.

A major difference between the key generation device provided in this embodiment and the key generation device provided in the previous embodiment lies in that the first optoelectronic detector 551, the second optoelectronic detector 552, and the homodyne detector 553 in this embodiment are used to replace the heterodyne detector 451 in the previous embodiment. In the previous embodiment, the heterodyne detector 451 detects a regular component of the second sub modulated optical signal. However, in this embodiment, the first optoelectronic detector 551 is used to detect intensity information of the second sub modulated optical signal, the second optoelectronic detector 552 is used to detect intensity information of the first light source signal, and the homodyne detector 553 is used to detect intensity information of a signal obtained after coherence between the second sub modulated optical signal and the first light source signal. After the three pieces of intensity information are determined, a phase difference between the second sub modulated optical signal and the first light source signal can be deduced. Finally, there is a conversion relationship between the regular component of the second sub modulated light and each of the intensity information of the second sub modulated optical signal and the phase difference between the second sub modulated optical signal and the first light source signal. Therefore, provided that the conversion relationship there between is known, the regular component of the second sub modulated light can be determined after the intensity information of the second sub modulated optical signal and the phase difference between the second sub modulated optical signal and the first light source signal are determined. In this case, a problem of obtaining the second key using the preset second data obtaining algorithm is converted into a problem of determining the intensity information of the second sub modulated optical signal and the phase difference between the second sub modulated optical signal and the first light source signal. Then, the method provided in the previous embodiment can still be used to obtain the second key using the regular component of the second sub modulated light.

The first optoelectronic detector 551, the second optoelectronic detector 552, and the homodyne detector 553 are used to replace the heterodyne detector 451 in the previous embodiment because the heterodyne detector 451 can detect two regular components of the second sub modulated optical signal, namely, an X component and a Y component. To detect the two regular components of the second sub modulated optical signal, the second sub modulated optical signal needs to be split again inside the heterodyne detector 451. To obtain a precise detection result, a relatively high requirement needs to be imposed on each of beam splitting ratio consistency and delay consistency inside the heterodyne detector 451. When a deviation occurs, the detection result has a deviation. Further, a data obtaining algorithm may further need to be modified, to compensate for the deviation. In this embodiment, the first optoelectronic detector 551, the second optoelectronic detector 552, and the homodyne detector 553 are used to replace the heterodyne detector 451 in the previous embodiment, and an optical signal no longer needs to be split inside the first optoelectronic detector 551, the second optoelectronic detector 552, and the homodyne detector 553. This imposes a low requirement on the component and is easy to implement.

Optionally, the processor is configured to obtain the second key based on the intensity information of the third sub modulated optical signal, the intensity information of the signal obtained after the coherence between the first sub light source signal and the fourth sub modulated optical signal, the intensity information of the second sub light source signal, a beam splitting ratio of the first beam splitter, transmittance of the attenuator, and the preset second data obtaining algorithm.

Optionally, the preset second data obtaining algorithm may be $$x_A = \sqrt{2\frac{V_A+1}{V_A-1}} \sqrt{\eta_{310}k_{240}} \sqrt{I_S} \cos\left(\cos^{-1}\frac{I_{BHD}}{2\sqrt{I_S I_{LR}}}\right), \text{ and} \quad \text{(Formula 12)}$$

$$p_A = -\sqrt{2\frac{V_A+1}{V_A-1}} \sqrt{\eta_{310}k_{240}} \sqrt{I_S} \sin\left(\cos^{-1}\frac{I_{BHD}}{2\sqrt{I_S I_{LR}}}\right),$$

where $I_S$ is the intensity information of the third sub modulated optical signal, $I_{LR}$ is the intensity information of the second sub light source signal, $I_{BHD}$ is the intensity information of the signal obtained after the coherence between the first sub light source signal and the fourth sub modulated optical signal, $k_{240}$ is the beam splitting ratio of the first beam splitter, $\eta_{310}$ is the transmittance of the attenuator, $V_A$ is an equivalent variance of an entangled state, and $x_A$ and $p_A$ constitute the second key.

During implementation, for the preset second data obtaining algorithm, it is assumed that the intensity information of the third sub modulated optical signal is $I_S$, the intensity information of the second sub light source signal is $I_{LR}$, and the intensity information of the signal obtained after the coherence between the first sub light source signal and the fourth sub modulated optical signal is $I_{BHD}$ A beam splitting ratio of the fourth beam splitter 520 and a beam splitting ratio of the fifth beam splitter 530 each are 50:50. The processor 453 determines regular components X and P of the second sub modulated optical signal based on the intensity information $I_S$ of the third sub modulated optical signal, the intensity information $I_{BHD}$ of the signal obtained after the coherence between the first sub light source signal and the fourth sub modulated optical signal, the intensity information $I_{LR}$ that is of the second sub light source signal and that is carried in the fourth digital electrical signal. These conversion relationships can be determined when the beam splitting ratio of the fourth beam splitter 520, the beam splitting ratio of the fifth beam splitter 530, and conversion efficiency of a detector are determined.

It is assumed that data detected by the first optoelectronic detector is $V_{I_S}$ and optical-to-electrical conversion efficiency of the first optoelectronic detector is $\eta_{E1}$, that data detected by the second optoelectronic detector is $V_{I_{LR}}$ and optical-to-electrical conversion efficiency of the second optoelectronic detector is $\eta_{E2}$, and that data detected by the homodyne detector is $V_{BHD}$ and comprehensive optical-to-electrical conversion efficiency of the homodyne detector is $\eta_{BHD}$. Then the relationship shown in Formula 13 exists $$I_S = \frac{V_{I_S}}{\eta_{E1}}, I_{LR} = \frac{V_{I_{LR}}}{\eta_{E2}}, \text{ and } I_{BHD} = \frac{V_{BHD}}{\eta_{BHD}}. \quad \text{(Formula 13)}$$

Information $\varphi_{SR}$ about the phase difference between the second sub modulated optical signal and the first light source signal is determined based on $I_S$, $I_{LR}$, $I_{BHD}$, and Formula 14

$$\varphi_{SR} = \cos^{-1} \frac{I_{BHD}}{2\sqrt{I_S I_{LR}}}. \quad \text{(Formula 14)}$$

Optionally, in this embodiment, the homodyne detector 553 may be replaced with a third optoelectronic detector. It is assumed that the intensity information that is about the signal obtained after the coherence between the second sub modulated optical signal and the first light source signal and that is detected by the third optoelectronic detector is $I_{PD}$. The information $\varphi_{SR}$ about the phase difference between the second sub modulated optical signal and the first light source signal is determined based on $I_S$, $I_{LR}$, $I_{PD}$, and Formula 15

$$\varphi_{SR} = \cos^{-1} \frac{I_{PD} - I_S - I_{LR}}{2\sqrt{I_S I_{LR}}}. \quad \text{(Formula 15)}$$

After $I_S$ and $\varphi_{SR}$ are determined, the regular components X and P of the second sub modulated optical signal may be represented in a form of Formula 16 using the first light source signal as a reference point $$X = 2\sqrt{I_S} \cos \varphi_{SR}, \text{ and } P = 2\sqrt{I_S} \sin \varphi_{SR} \quad \text{(Formula 16)}.$$

A relationship between the regular components X and P of the second sub modulated optical signal and two regular components of a quantum signal sent by the attenuator 310 to a channel is $$x_{310} = \sqrt{\eta_{310} k_{240}} X = 2\sqrt{\eta_{310} k_{240}} \sqrt{I_S} \cos \varphi_{SR}, \text{ and}$$

$$p_{310} = \sqrt{\eta_{310} k_{240}} P = 2\sqrt{\eta_{310} k_{240}} \sqrt{I_S} \sin \varphi_{SR} \quad \text{(Formula 17)}.$$

After $x_{310}$ and $p_{310}$ are obtained, a key used for communication with the receive-end device is $$x_A = f_x(x_{310}, p_{310}), \text{ and } p_A = f_p(x_{310}, p_{310}) \quad \text{(Formula 18)},$$

where $f_x$ and $f_p$ are two functions that vary according to different modulation standards. In Gaussian modulation, the foregoing function relationship is very simple. Using an equivalent variance of an entangled state (two-mode squeezed state) of a transmit end as an example, the foregoing relationship is $$x_A = \sqrt{\frac{1}{2} \frac{V_A + 1}{V_A - 1}} \, x_{310} = \quad \text{(Formula 19)}$$

$$\pm \sqrt{2 \frac{V_A + 1}{V_A - 1}} \sqrt{\eta_{310} k_{240}} \sqrt{I_S} \cos \varphi_{SR}, \text{ and}$$

$$p_A = -\sqrt{\frac{1}{2} \frac{V_A + 1}{V_A - 1}} \, p_{310} =$$

$$\pm \sqrt{2 \frac{V_A + 1}{V_A - 1}} \sqrt{\eta_{310} k_{240}} \sqrt{I_S} \sin \varphi_{SR}$$

During implementation, in an embodiment, $x_A$ and $p_A$ both may be positive numbers or both may be negative numbers, or one of $x_A$ and $p_A$ may be a positive number, and the other one is a negative number. There are four representation manners in total. In addition, it should be further noted that if the fourth beam splitter 520 and the fifth beam splitter 530 are not ideal beam splitters. Two nominal parameters may be further determined for each of the fourth beam splitter 520 and the fifth beam splitter 530. Using the fourth beam splitter 520 as an example, a first parameter is transmittance from the input end of the fourth beam splitter 520 to the first output end of the fourth beam splitter, and is denoted as $\eta_{41}$, and a second parameter is transmittance from the input end of the fourth beam splitter 520 to the second output end of the beam splitter, and is denoted as $\eta_{42}$. Similarly, the fifth beam splitter 530 also has two parameters, namely, $\eta_{51}$ and $\eta_{51}$. Then, correction relationships shown in Formula 20 and Formula 21 exist $$\varphi_{SR} = \cos^{-1} \frac{I_{BHD}}{2\sqrt{\frac{\eta_{42} \eta_{52}}{\eta_{41} \eta_{51}} I_S I_{LR}}} \text{ or} \quad \text{(Formula 20)}$$

$$\varphi_{SR} = \cos^{-1} \frac{I_{BHD} - \frac{\eta_{52}}{\eta_{51}} I_S - \frac{\eta_{42}}{\eta_{41}} I_{LR}}{2\sqrt{\frac{\eta_{42} \eta_{52}}{\eta_{41} \eta_{51}} I_S I_{LR}}},$$

and $$X = \sqrt{\frac{2}{\eta_{51}} I_S} \cos \varphi_{SR}, P = \sqrt{\frac{2}{\eta_{51}} I_S} \sin \varphi_{SR}. \quad \text{(Formula 21)}$$

Figure 7:
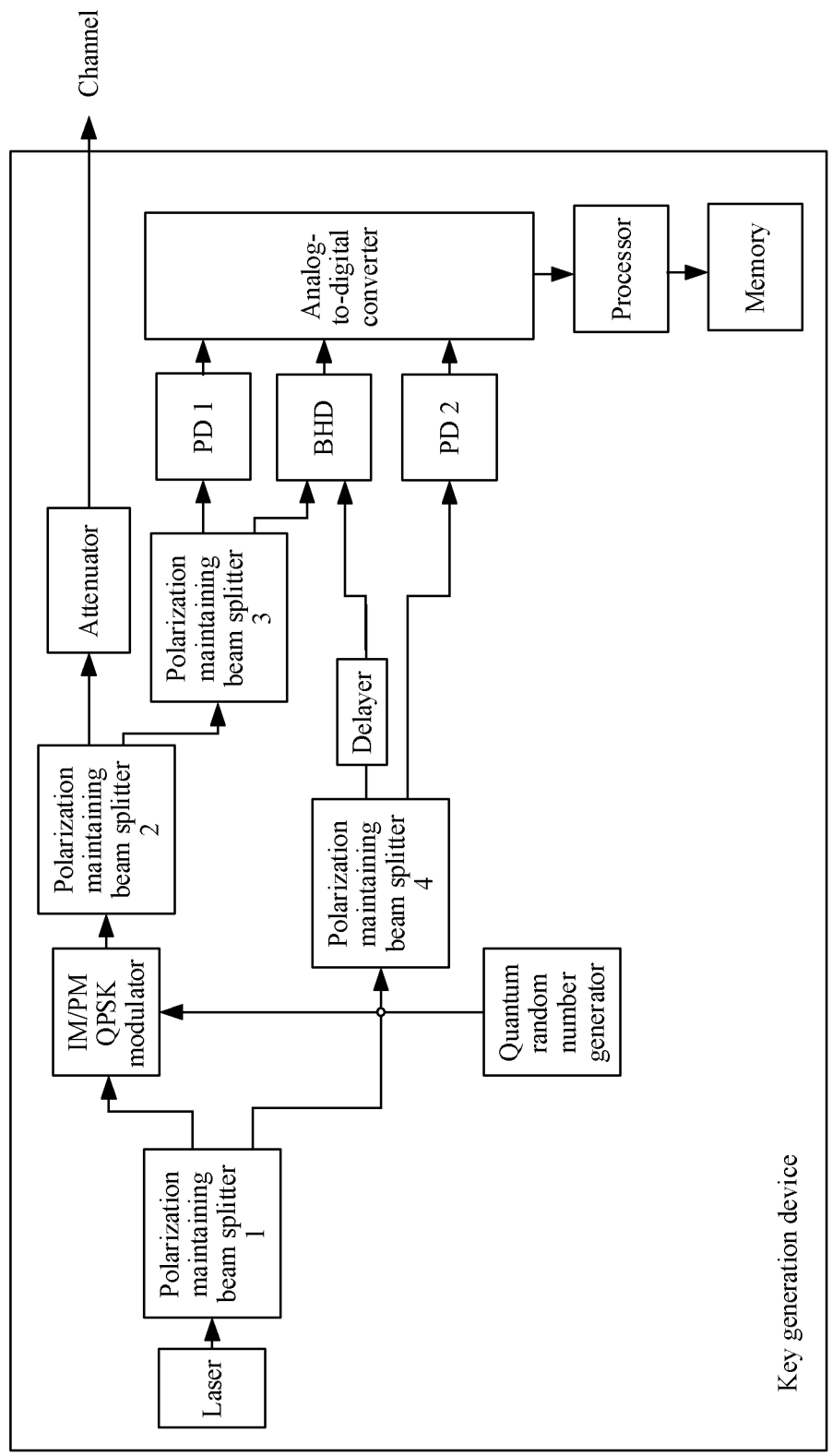
FIG. 7 is a schematic structural diagram of a key generation device according to an example embodiment.

FIG. 7 is a schematic structural diagram of a key generation device constructed using the foregoing components. A working procedure of internal components of the key generation device is as follows.

(1) A laser generates a continuous linearly polarized narrow-linewidth laser beam and inputs the laser beam into a pulse generator, to generate an optical pulse having a high extinction ratio. A duty cycle of the pulse may be controlled within 1% to 99%.

(2) The optical pulse is divided into two signals using a polarization maintaining beam splitter 1. One signal may be used as a first light source signal, and the other signal may be used as a second light source signal.

(3) A modulator is used to modulate a random key to the first light source signal.

(4) A polarization maintaining beam splitter 2 splits a modulated optical signal, to obtain a first sub modulated optical signal and a second sub modulated optical signal, and sends, to the receive-end device through a first output end, a first sub modulated optical signal that is attenuated by an attenuator and that meets an extremely weak coherent state required by a CV-QKD protocol. A polarization maintaining beam splitter 3 splits the second sub modulated optical signal, to obtain a third sub modulated optical signal and a fourth sub modulated optical signal. A polarization maintaining beam splitter 4 splits the second light source signal, to obtain a first sub light source signal and a second sub light source signal. The third sub modulated optical signal is input into a PD 1 for detection. The second sub light source signal is input into a PD 2 for detection. The fourth sub modulated optical signal and the first sub light source signal are input into a balanced homodyne detection (BHD) for detection.

If the fourth sub modulated optical signal and the first sub light source signal are required to arrive at the BHD at a same time, a delay operation may be performed on the first sub light source signal using a delayer. It should be noted that if the laser beam generated by the laser is continuous and has a narrow linewidth and a relatively long coherence time, the BHD can obtain a relatively precise measurement result without setting the delayer to perform a delay operation.

(5) The PD 1 detects the third sub modulated optical signal, to obtain a second analog electrical signal that carries intensity information of the third sub modulated optical signal. The BHD detects the first sub light source signal and the fourth sub modulated optical signal, to obtain a third analog electrical signal that carries intensity information of a signal obtained after coherence between the first sub light source signal and the fourth sub modulated optical signal. The PD 2 detects the second sub light source signal, to obtain a fourth analog electrical signal that carries intensity information of the second sub light source signal. The analog electrical signals may be converted, through sampling performed by an ADC, into forms of digital electrical signals. This helps a processor perform an operation or processing on information carried in these digital electrical signals. The processor may obtain a second key based on the information carried in these digital electrical signals and the preset second data obtaining algorithm. The data may be used as data, of a transmit-end device, to be subsequently used in post-processing required by the CV-QKD protocol.

Optionally, the key generation device provided in this embodiment may be applied to a locally LO system. The locally LO system does not require the transmit-end device to provide an LO (a light source signal) to the receive-end device. However, if the key generation device provided in this embodiment needs to be applied to an associated LO system, a beam splitter and a beam combiner need to be further added based on the components already provided. Optionally, the beam combiner may be a polarization maintaining beam combiner.

Optionally, if the transmit-end device uses a dual-polarization modulation scheme, a light source signal needs to be independently modulated in two polarization directions. Therefore, the structure provided in this embodiment may be used for each of key generation instruments in the two polarization directions.

In this embodiment, the first optoelectronic detector 551, the second optoelectronic detector 552, and the homodyne detector 553 are used to replace the heterodyne detector 451 in the previous embodiment. This avoids an operation disadvantage that the second sub modulated optical signal needs to be split again inside the heterodyne detector 451 in order that the heterodyne 451 detects the two regular components of the second sub modulated optical signal. In this embodiment, a signal entered the homodyne detector 553 does not need to be split again. Therefore, a step of improving a data obtaining algorithm to compensate for a deviation caused by beam splitting and a delay that are caused only by the heterodyne detector 451 is omitted. If the homodyne detector 553 is replaced with the third optoelectronic detector, the key generation device includes simpler components.

According to the key generation device provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by the transmit-end device. This avoids a case in which an association between the second key stored in the transmit-end device and the key used for communication with the receive-end device is relatively weak. Further, this can improve a success rate of preparing and transmitting a key, thereby avoiding system resource waste.

Figure 8:
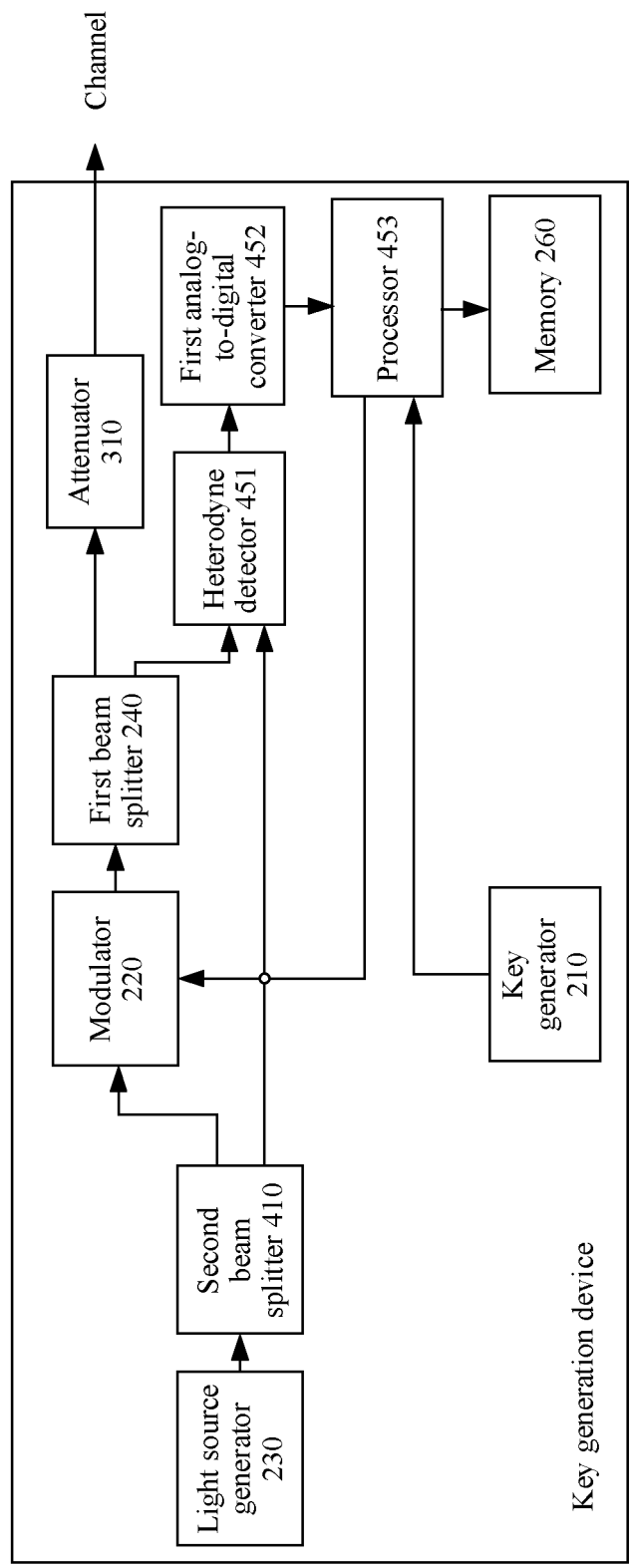
FIG. 8 is a schematic structural diagram of a key generation device according to an example embodiment.

An example embodiment of this application provides a key generation device. As shown in FIG. 8, the device may include a key generator 210, a modulator 220, a light source generator 230, a first beam splitter 240, a second beam splitter 410, a heterodyne detector 451, a first analog-to-digital converter 452, a processor 453, an attenuator 310, and a memory 260.

In terms of structure, an output end of the modulator 220 is connected to an input end of the first beam splitter 240, and optionally, the output end of the modulator 220 may be connected to the input end of the first beam splitter 240 through an optical path. The first beam splitter 240 includes a first output end and a second output end. An input end of the second beam splitter 410 is connected to the light source generator 230, and optionally, the input end of the second beam splitter 410 may be connected to the light source generator 230 through an optical path. The second output end of the first beam splitter 240 is connected to a first input end of the heterodyne detector 451, and optionally, the second output end of the first beam splitter 240 may be connected to the first input end of the heterodyne detector 451 through an optical path. A first output end of the second beam splitter 410 is connected to an optical input end of the modulator 220, and optionally, the first output end of the second beam splitter 410 may be connected to the optical input end of the modulator 220 through an optical path. A second output end of the second beam splitter 410 is connected to a second input end of the heterodyne detector 451, and optionally, the second output end of the second beam splitter 410 may be connected to the second input end of the heterodyne detector 451 through an optical path. An output end of the heterodyne detector 451 is connected to an input end of the first analog-to-digital converter 452, and optionally, the output end of the heterodyne detector 451 may be electrically connected to the input end of the first analog-to-digital converter 452. An output end of the first analog-to-digital converter 452 is connected to a first input end of the processor 453, and optionally, the output end of the first analog-to-digital converter 452 may be electrically connected to the first input end of the processor 453. A first output end of the processor 453 is connected to the memory 260, and optionally, the first output end of the processor 453 may be electrically connected to the memory 260. A second input end of the processor 453 is connected to an output end of the key generator 210, and optionally, the second input end of the processor 453 may be electrically connected to the output end of the key generator 210. A second output end of the processor 453 is connected to an electrical input end of the modulator 220, and optionally, the second output end of the processor 453 may be electrically connected to the electrical input end of the modulator 220.

In terms of function, the modulator 220 is configured to modulate a first key to a first light source signal, to obtain a modulated optical signal. The first beam splitter 240 is configured to split the modulated optical signal, to obtain a first sub modulated optical signal and a second sub modulated optical signal. The second beam splitter 410 is configured to split an original light source signal, to obtain the first light source signal and a second light source signal. The attenuator 310 is configured to attenuate the first sub modulated optical signal such that a quantity of photons included in each period of the first sub modulated optical signal is less than a preset value, and send an attenuated first sub modulated optical signal to a receive-end device. The heterodyne detector 451 is configured to detect the second sub modulated optical signal and the second light source signal, to obtain a first analog electrical signal that carries regular component information of the second sub modulated optical signal. The first analog-to-digital converter 452 is configured to perform analog-to-digital conversion on the first analog electrical signal to obtain a first digital electrical signal that carries the regular component information of the second sub modulated optical signal. The processor 453 is configured to obtain a second key based on the regular component information carried in the first digital electrical signal and a preset first data obtaining algorithm. The memory 260 is configured to store the second key. The second key is a key obtained after a bit error occurs when the first key is modulated to the first light source signal, and the second key is a key to be used during communication with the receive-end device. The processor 453 is further configured to determine, based on the first key and the second key that are determined in a preset quantity of processing processes of determining the second key, a conversion relationship between the first key and the second key, obtain the first key generated by the key generator 210, and determine an adjusted first key based on the first key and a reverse conversion relationship corresponding to the conversion relationship. The modulator 220 is configured to modulate the adjusted first key to the first light source signal, to obtain the modulated optical signal.

Specifically, the processor 453 is further configured to determine, based on the first key and the second key that are determined in the preset quantity of processing processes of determining the second key, the conversion function $y=f(x)$ between the first key and the second key, where $y$ is the second key, and $x$ is the first key, and obtain the first key $x_1$ generated by the key generator 210, where $y=x_1$ is substituted into an inverse function of $y=f(x)$ to obtain $x_2$, and $x_2$ is used as the adjusted first key.

During implementation, there may be various reasons causing a key that is determined using an algorithm and that is used for communication with the receive-end device to greatly differ from the first key. For example, a bias point of an IM obviously drifts. If the key that is determined using the algorithm and that is used for communication with the receive-end device greatly differs from the first key, even though there is a fairly good association between an actually sent quantum signal and the key that is determined using the algorithm and that is used for communication with the receive-end device, probability distributions of two regular components of the actually sent quantum signal cannot meet a requirement of a modulation standard. For example, in Gaussian modulation, the probability distributions of the two regular components of the actually sent quantum signal are expected to respectively meet two independent Gaussian distributions.

During implementation, if the second key greatly differs from the first key, a system needs to be recalibrated, or even the key generated in a current round is discarded. The key generation device provided in this embodiment enables the key that is determined using the algorithm and that is used for communication with the receive-end device to not greatly differ from the first key such that the second key generated in the current round does not need to be discarded. This embodiment provides a manner of calibrating the system in a data plane, that is, calibrating the system using a data pre-compensation operation.

When the foregoing case occurs, it is necessary to perform troubleshooting on all the components one by one. However, this operation manner also encounters some difficulties. Therefore, in this embodiment, the data pre-compensation operation is proposed to correct an obvious directional deviation that occurs in a modulation result. The directional deviation is described using an example. If data X1 and P1 are massively repeatedly modulated to a quantum signal, a detection result for a modulated quantum signal is X2 and P2. In this case, the directional deviation describes deviations of average values of X2 and P2 from X1 and P1, where $\langle X2 \rangle - X1 \approx 0$ and $\langle P2 \rangle - P1 \neq 0$. A case opposite to this may be referred to as a noise deviation. In an embodiment, when $X2 \neq X1$ and $P2 \neq P1$, $\langle X2 \rangle - X1 = 0$ and $\langle P2 \rangle - P1 = 0$.

In this embodiment, the system is calibrated in the data plane, and a physical feature of a component included in the modulator 220 cannot be actually improved. As a result, a noise modulation error of the system still exists. Therefore, it is still necessary to calculate, using the detection result, the key used for communication with the receive-end device.

Figure 9:
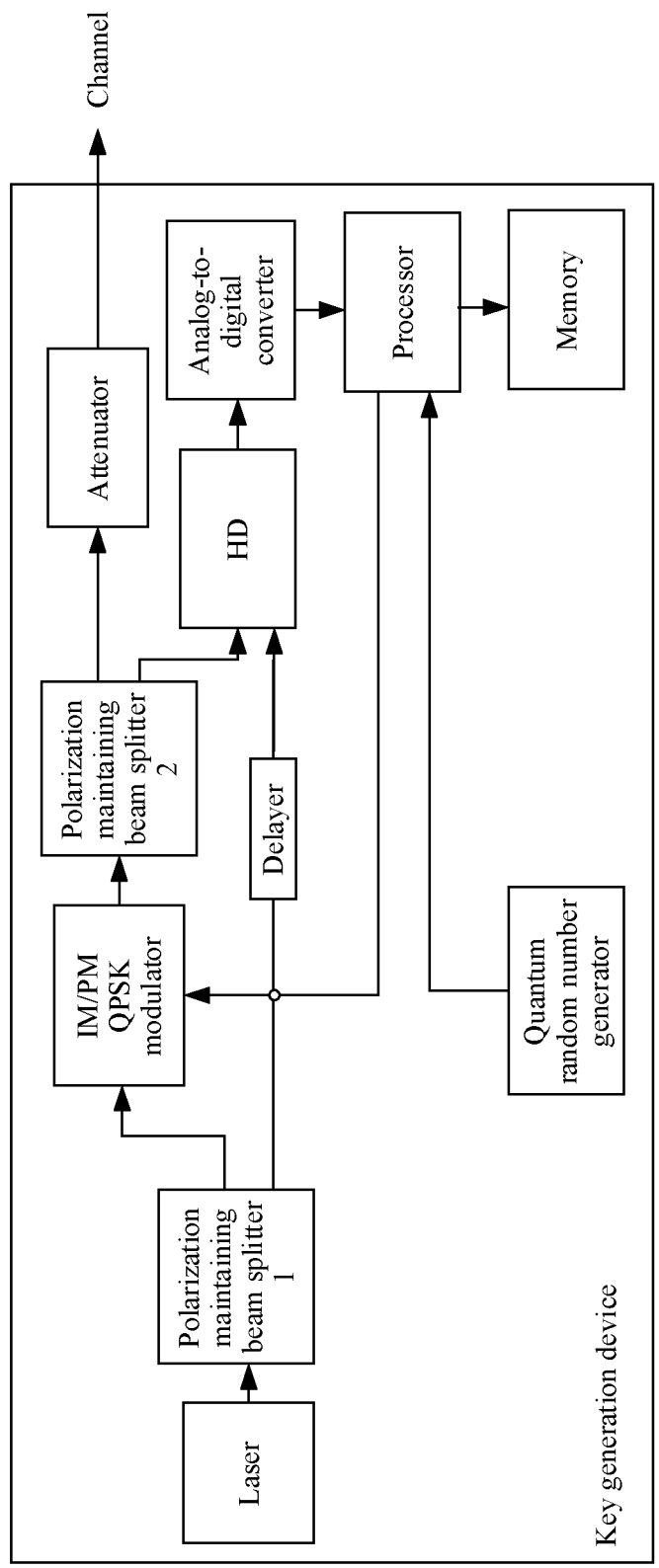
FIG. 9 is a schematic structural diagram of a key generation device according to an example embodiment.

FIG. 9 is a schematic structural diagram of a key generation device in a specific application scenario. An internal working procedure of the key generation device is as follows.

(1) A laser generates a continuous linearly polarized narrow-linewidth laser beam and inputs the laser beam into a pulse generator, to generate an optical pulse having a high extinction ratio. A duty cycle of the pulse may be controlled within 1% to 99%.

(2) The optical pulse is divided into two signals using a polarization maintaining beam splitter 1. One signal may be used as a first light source signal, and the other signal may be used as a second light source signal.

(3) A modulator is used to modulate the first light source signal. However, data used for modulation herein is no longer data directly obtained from a quantum random number generator, but data obtained after compensation is actually used. Specifically, the data obtained after compensation is obtained by performing a pre-compensation operation on a random key based on a data pre-compensation relationship table. It should be noted that during system initialization, the data pre-compensation relationship table is original mapping, that is, no compensation operation is performed.

(4) A polarization maintaining beam splitter 2 splits a modulated optical signal, to obtain a first sub modulated optical signal and a second sub modulated optical signal, and sends, to the receive-end device through a first output end, a first sub modulated optical signal that is attenuated by an attenuator and that meets an extremely weak coherent state required by a CV-QKD protocol. The polarization maintaining beam splitter 1 splits an original light source signal, to obtain the first light source signal and the second light source signal. An HD detects the second sub modulated optical signal and the second light source signal, and the second sub modulated optical signal and the second light source signal arrive at the HD at a same time. To enable the second sub modulated optical signal and the second light source signal to arrive at the HD at a same time, a delay operation may be performed on the second light source signal using a delayer.

(5) The HD detects the second sub modulated optical signal and the second light source signal, to obtain a first analog electrical signal that carries regular component information of the second sub modulated optical signal. An ADC performs sampling to obtain a first digital electrical signal that carries the regular component information of the second sub modulated optical signal. A processor may obtain a second key based on the regular component information carried in the first digital electrical signal and a preset first data obtaining algorithm.

(6) The processor further needs to compare a first key generated by the quantum random number generator and key data that is obtained after compensation and that is used to modulate the second sub modulated optical signal, to update the data pre-compensation relationship table based on a comparison result. It can be learned that the data pre-compensation relationship table dynamically changes based on a system modulation feature. If the system modulation feature changes relatively slowly, an updated data pre-compensation relationship table may be consistent with the data pre-compensation relationship table before update.

The proposed manner of calibrating the system using a data pre-compensation operation in this embodiment aims to reduce a directional deviation generated in the modulator 220 as much as possible. Therefore, a relationship recorded in the data pre-compensation relationship table is actually a relationship between to-be-modulated data $(x_{mod}, p_{mod})$ and an average value $(\bar{x}_{HD}, \bar{p}_{HD})$ of results output after modulation. For a relational expression between the to-be-modulated data and the average value of results output after modulation, refer to Formula 22

$$\bar{x}_{HD} = f_x(x_{mod}, p_{mod}), \text{ and } \bar{p}_{HD} = f_p(x_{mod}, p_{mod}) \quad \text{(Formula 22)}.$$

To determine the functions $f_x$ and $f_p$ in Formula 22, statistics about average values of obtained second keys may be collected based on each group of regular components of the second key. If a volume of data that can be used for statistics collection is not large enough after system initialization, to improve accuracy, statistics collection may be performed after regular components of keys generated in a plurality of times are accumulated.

However, if the system modulation feature changes relatively rapidly, deduction may be performed based on a previous statistical result and a current statistical result, to obtain a predicted data pre-compensation relationship table for key generation in a next time. For example, if functions obtained when statistic collection is performed for an $i^{th}$ time are $f_{xi}$ and $f_{pi}$, for a same group of to-be-modulated data $(x_{modi}, p_{modi})$, average values that are of obtained second keys and that are obtained in the first i times of statistics collection are a sequence $\{\bar{x}_{HD}^{(i)}\}$. An $(i+1)^{th}$ value $\bar{x}_{HD}^{(i+1)}$ may be extrapolated in a plurality of manners based on the sequence, and $\bar{x}_{HD}^{(i+1)}$ may be used as a prediction of a data pre-compensation relationship table for key generation in a next time. In this case, a prediction error inevitably occurs. However, first, the system modulation feature actually is usually impossible to change rapidly, and second, when the system modulation feature indeed changes rapidly actually, using a proper prediction manner to predict the data pre-compensation relationship table for key generation in the next time is effective to an extent. For example, the proper prediction manner is a digital PID control algorithm.

It is assumed that a random key is generated based on a probability distribution required by a modulation standard and is denoted as $x_{ori}$ and $p_{ori}$. Data obtained after compensation is denoted as $x_{mod}$ and $p_{mod}$. The data pre-compensation operation in this embodiment is an operation of calculating $x_{mod}$ and $p_{mod}$ based on $x_{ori}$ and $p_{ori}$, where $x_{ori}$ and $p_{ori}$ may be used as an original key, and $x_{mod}$ and $p_{mod}$ may be used as a second key.

A plurality of methods that can be used to make probability distributions of two regular components of an actually sent quantum signal meet probability distributions required by a modulation standard. A simple manner is selected and described in this embodiment. Assuming that $x_{ori} = \bar{x}_{HD}$, and $p_{ori} = \bar{p}_{HD}$, the following relationship exists $$x_{ori} = f_x(x_{mod}, p_{mod}), \text{ and } p_{ori} = f_p(x_{mod}, p_{mod}) \quad \text{(Formula 23)}$$

where $x_{mod}$ and $p_{mod}$ that meet relationships of the functions $f_x$ and $f_p$ are calculated based on $x_{ori}$ and $p_{ori}$, and may be represented as inverse functions of $f_x$ and $f_p$ $$x_{mod} = f_x^{-1}(x_{ori}, p_{ori}) \text{ and } p_{mod} = f_p^{-1}(x_{ori}, p_{ori}) \quad \text{(Formula 24)}.$$

When a plurality of inverse functions exist, any one of the inverse functions may be) selected. Preferably, a preimage nearest to $(x_{ori}, P_{ori})$ may be selected, that is, an inverse function corresponding to a minimum value of $(x_{mod} - x_{ori})^2 + (p_{mod} - p_{ori})^2$ may be selected.

Optionally, the data pre-compensation operation provided in this embodiment may also be applied to the key generation device in which the heterodyne detector 451 replaced with the first optoelectronic detector 551, the second optoelectronic detector 552, and the homodyne detector 553 is used.

The data pre-compensation operation is added to the key generation device provided in this embodiment. The data pre-compensation operation may be used to resolve a problem that an actual modulation result does not meet a probability distribution required by a modulation standard because of the directional deviation of the modulator 220. In addition, for a noise deviation of the modulator 220, when a key for modulation is generated, the key is compensated for, to finally achieve an effect that a key carried in an actually sent quantum signal and a key used for communication with the receive-end device have a relatively strong association, and both of the keys also meet the probability distribution required by the modulation standard.

According to the key generation device provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by a transmit-end device. This avoids a case in which an association between the second key stored in the transmit-end device and the key used for communication with the receive-end device is relatively weak. Further, this can improve a success rate of preparing and transmitting a key, thereby avoiding system resource waste.

Figure 10:
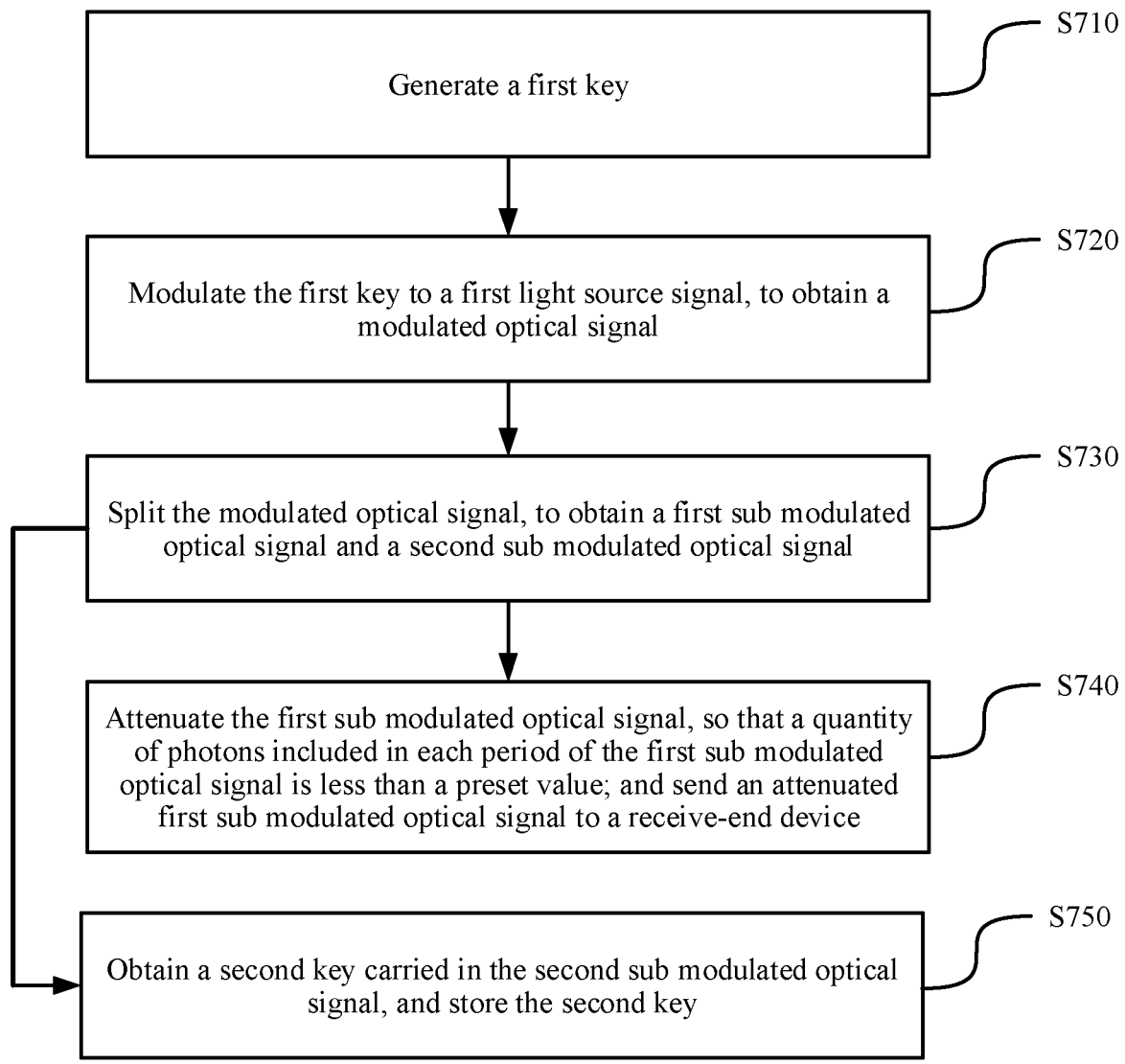
FIG. 10 is a schematic flowchart of a key generation method according to an example embodiment.

An example embodiment of this application provides a key generation method. As shown in FIG. 10, a processing procedure of the method may include the following steps.

Step S710. Generate a first key.

Step S720. Modulate the first key to a first light source signal, to obtain a modulated optical signal.

During implementation, a light source generator such as a laser may be used to generate the first light source signal, and a key generator such as a quantum random number generator may be used to generate the first key.

Step S730. Split the modulated optical signal, to obtain a first sub modulated optical signal and a second sub modulated optical signal.

During implementation, a beam splitter may be used to split the modulated optical signal.

Step S740. Attenuate the first sub modulated optical signal such that a quantity of photons included in each period of the first sub modulated optical signal is less than a preset value, and send an attenuated first sub modulated optical signal to a receive-end device.

During implementation, the first sub modulated optical signal attenuated using an attenuator may be automatically sent to the receive-end device through an optical path such as an optical fiber.

Step S750. Obtain a second key carried in the second sub modulated optical signal, and store the second key in a memory, where the second key is a key obtained after a bit error occurs when the first key is modulated to the first light source signal, and the second key is a key to be used during communication with the receive-end device.

During implementation, a data obtainer may be used to obtain the key carried in the second sub modulated optical signal, and a memory may be used to store the key carried in the second sub modulated optical signal for subsequent communication with the receive-end device.

During implementation, the light source generator may be used to generate the first light source signal. After entering a modulator, the first light source signal may be modulated using the first key generated by the key generator, to generate the modulated optical signal. The modulated optical signal carries the first key. The first key may be a random key. The quantum random number generator may be used to generate the random key, and a probability distribution of the generated random key may be made to meet a Gaussian distribution required by a CV-QKD protocol.

In an ideal state, a modulated optical signal, namely, a quantum signal, finally sent from a transmit-end device carries the first key. However, because of inaccurate modulation caused by an inherent disadvantage of a component such as an AWG/ADC, a driver, or an IM/PM in the modulator, the quantum signal finally actually sent from the transmit-end device does not carry the first key. Inherent disadvantages of the components in the modulator are as follows. (1) From a perspective of an electrical signal output by the driver, a waveform of the electrical signal has problems such as overshoot, oscillation, and noise. There is also a problem of nonlinearity between the electrical signal and the first key. A first key in a previous period affects a subsequent modulation result to a specific extent, and the output electrical signal has a problem such as a jitter in time domain. (2) From a perspective of an optical modulation component, input impedance of the optical modulation component cannot completely match output impedance of the driver, causing inconsistent frequency responses and a relatively great impact on an alternating current signal. This finally causes an undesirable chirp parameter, an undesirable extinction ratio, and an unstable operating point.

Because of inaccurate modulation caused by the component in the modulator, data actually carried in the modulated optical signal obtained through modulation is uncertain. Therefore, the key carried in the modulated optical signal needs to be obtained. A specific method is as follows. A first beam splitter may be used to split the modulated optical signal, to obtain the first sub modulated optical signal and the second sub modulated optical signal. The first sub modulated optical signal may be used as a signal to be sent to the receive-end device, to send a prepared key to the receive-end device. The second sub modulated optical signal may be used as a signal for detecting a modulation result. The second sub modulated optical signal is input into the data obtainer, and the data obtainer is used to obtain the key carried in the second sub modulated optical signal. A beam splitting ratio of the first beam splitter may be learned of and may be set to 50:50. Therefore, if the beam splitting ratio is 50:50, the first sub modulated optical signal and the second sub modulated optical signal have a same light field state. A key carried in the first sub modulated optical signal is related to a light field state. Therefore, there is a relatively strong association between the key actually carried in the first sub modulated optical signal and the key that is carried in the second sub modulated optical signal and that is obtained using the data obtainer. The association means that the key carried in the first sub modulated optical signal and the key carried in the second sub modulated optical signal are in a one-to-one correspondence or even have a linear relationship. Finally, after obtaining the key carried in the second sub modulated optical signal, the data obtainer stores the key in the local transmit-end device for a subsequent post-processing operation such that the transmit-end device finally shares a same group of security keys with the receive-end device.

During implementation, the attenuator may be used to attenuate the first sub modulated optical signal, to attenuate, to an extremely weak coherent state required by a CV-QKD protocol, a laser beam that has relatively strong power and that is output by the light source generator such as a laser. It should be noted that in a CV-QKD system, a light source signal may be first modulated and then attenuated, or a light source signal may be first attenuated and then modulated. However, in this embodiment of this application, preferably, the light source signal is first modulated and then attenuated. Before the light source signal is attenuated, power of the light source signal is still relatively strong and is not prone to be affected by quantum noise. Therefore, precision of measuring the light source signal by the data obtainer is relatively high. Moreover, different from the modulator, the beam splitter and the attenuator both are common energy attenuation components and do not exert an unpredictable impact on data carried in an optical signal.

Optionally, the key generation method provided in this embodiment of this application may be applied to an associated LO system, or may be applied to a locally LO system.

According to the key generation method provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by the transmit-end device. This avoids a case in which an association between the second key stored in the transmit-end device and the key used for communication with the receive-end device is relatively weak. Further, this can improve a success rate of preparing and transmitting a key, thereby avoiding system resource waste.

Figure 11:
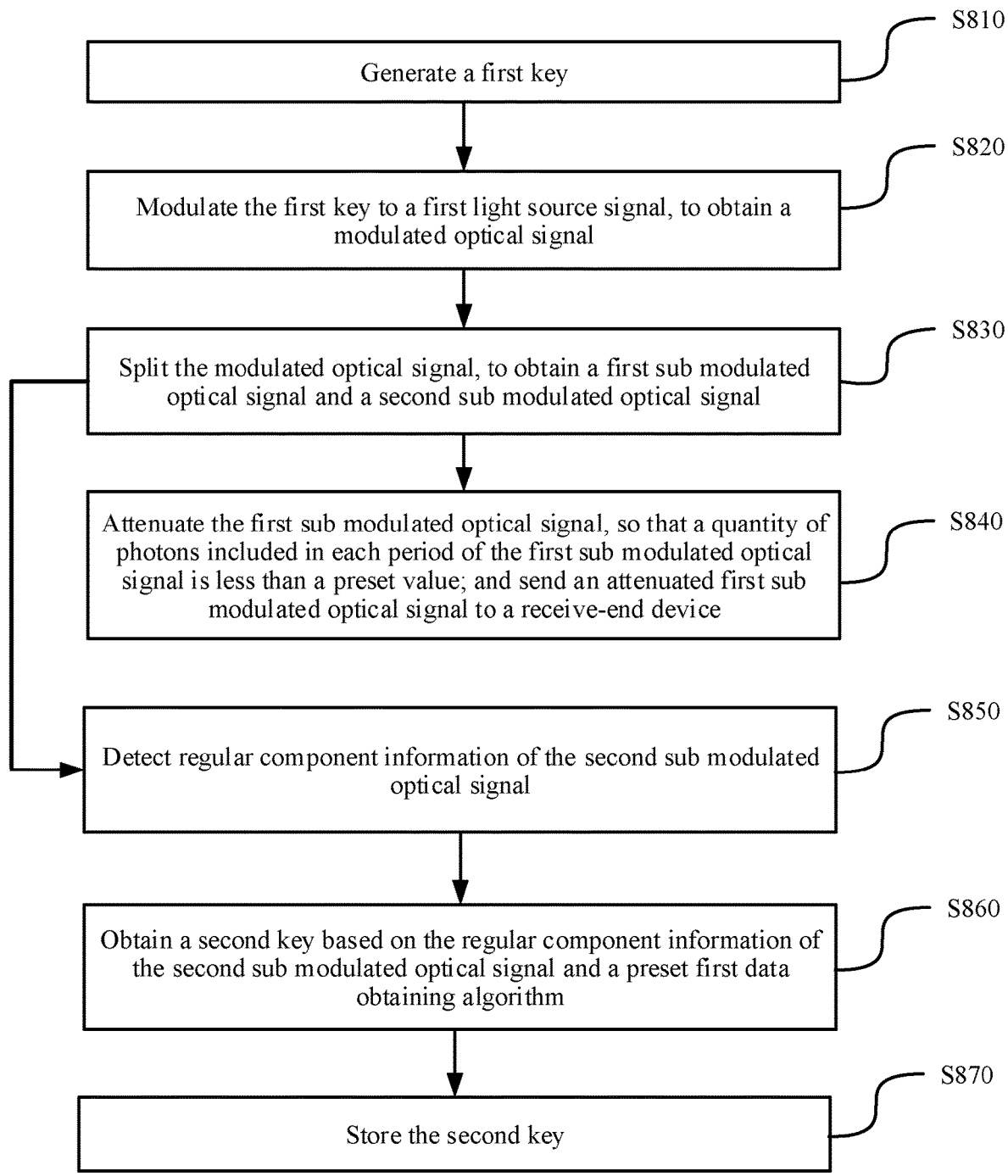
FIG. 11 is a schematic flowchart of a key generation method according to an example embodiment.

An example embodiment of this application provides a key generation method. As shown in FIG. 11, a processing procedure of the method may include the following steps.

Step S810. Generate a first key.

Step S820. Modulate the first key to a first light source signal, to obtain a modulated optical signal.

During implementation, a light source generator such as a laser may be used to generate the first light source signal, and a key generator such as a quantum random number generator may be used to generate the first key.

Step S830. Split the modulated optical signal, to obtain a first sub modulated optical signal and a second sub modulated optical signal.

During implementation, a beam splitter may be used to split the modulated optical signal.

Step S840. Attenuate the first sub modulated optical signal such that a quantity of photons included in each period of the first sub modulated optical signal is less than a preset value, and send an attenuated first sub modulated optical signal to a receive-end device.

During implementation, the first sub modulated optical signal obtained by the beam splitter through splitting may be automatically sent to the receive-end device through an optical path such as an optical fiber.

Step S850. Detect regular component information of the second sub modulated optical signal.

During implementation, a heterodyne detector may be used to detect the second sub modulated optical signal, to obtain the regular component information carried in the second sub modulated optical signal.

Step S860. Obtain a second key based on the regular component information of the second sub modulated optical signal and a preset first data obtaining algorithm.

During implementation, a processor may determine, based on the regular component information of the second sub modulated optical signal and the preset first data obtaining algorithm, the key carried in the second sub modulated optical signal.

Step S870. Store the second key, where the second key is a key obtained after a bit error occurs when the first key is modulated to the first light source signal, and the second key is a key to be used during communication with the receive-end device.

During implementation, a data obtainer may be used to obtain the key carried in the second sub modulated optical signal, and a memory may be used to store data.

Optionally, step S860 may include obtaining the second key based on the regular component information of the second sub modulated optical signal, detection efficiency of the heterodyne detector for detecting the regular component information of the second sub modulated optical signal, intensity information of a second light source signal used for detecting the regular component information, a beam splitting ratio for splitting the modulated optical signal, transmittance for attenuating first sub modulated optical signal, and the preset first data obtaining algorithm. The second light source signal and the first light source signal have a same phase.

Optionally, the preset first data obtaining algorithm may be $$x_A = \frac{1}{\eta_D} \sqrt{\frac{2\eta_{310}k_{240}}{I_{LO}} \frac{V_A+1}{V_A-1}} X, \quad \text{(Formula 25)}$$

-continued $$p_A = -\frac{1}{\eta_D} \sqrt{\frac{2\eta_{310}k_{240}}{I_{LO}} \frac{V_A+1}{V_A-1}} P,$$

where $\eta_D$ is the detection efficiency of the heterodyne detector, $I_{LO}$ is the intensity information of the second light source signal, $k_{240}$ is the beam splitting ratio for splitting the modulated optical signal, $\eta_{310}$ is the transmittance for attenuating the first sub modulated optical signal, $V_A$ is an equivalent variance of an entangled state, X and P are the regular component information of the second sub modulated optical signal, and $x_A$ and $p_A$ constitute the second key.

A specific operation manner of the method in this embodiment has been described in detail in the related device embodiment. Details are not described herein.

According to the key generation method provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by a transmit-end device. This avoids a case in which an association between the second key stored in the transmit-end device and the key used for communication with the receive-end device is relatively weak. Further, this can improve a success rate of preparing and transmitting a key, thereby avoiding system resource waste.

Figure 12:
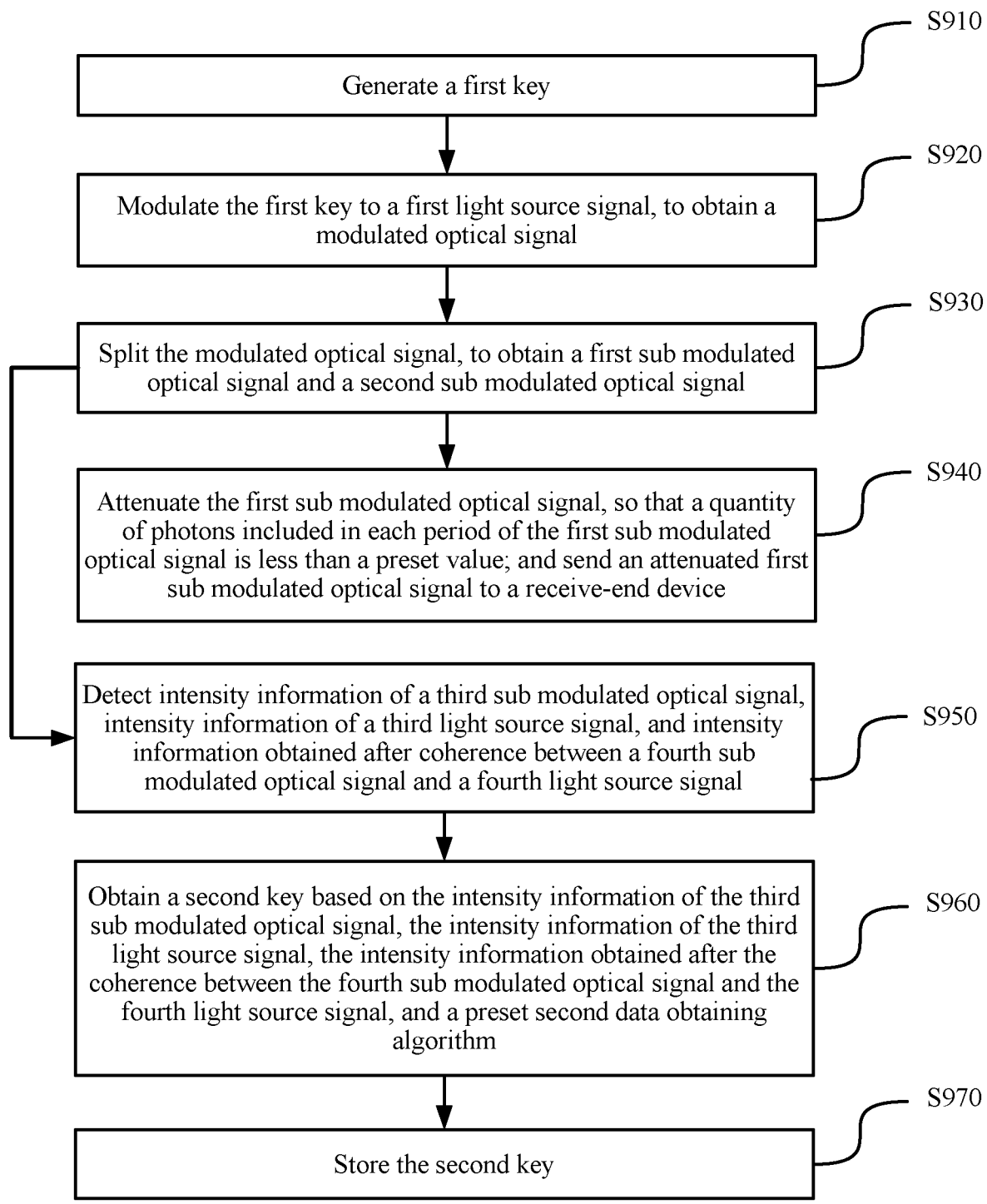
FIG. 12 is a schematic flowchart of a key generation method according to an example embodiment.

An example embodiment of this application provides a key generation method. As shown in FIG. 12, a processing procedure of the method may include the following steps.

Step S910. Generate a first key.

Step S920. Modulate the first key to a first light source signal, to obtain a modulated optical signal.

During implementation, a light source generator such as a laser may be used to generate the first light source signal, and a key generator such as a quantum random number generator may be used to generate the first key.

Step S930. Split the modulated optical signal, to obtain a first sub modulated optical signal and a second sub modulated optical signal.

During implementation, a beam splitter may be used to split the modulated optical signal.

Step S940. Attenuate the first sub modulated optical signal such that a quantity of photons included in each period of the first sub modulated optical signal is less than a preset value, and send an attenuated first sub modulated optical signal to a receive-end device.

During implementation, the first sub modulated optical signal obtained by the beam splitter through splitting may be automatically sent to the receive-end device through an optical path such as an optical fiber.

Step S950. Detect intensity information of a third sub modulated optical signal, intensity information of a third light source signal, and intensity information obtained after coherence between a fourth sub modulated optical signal and a fourth light source signal, where the third sub modulated optical signal and the fourth sub modulated optical signal are optical signals obtained by splitting the second sub modulated optical signal, and the third light source signal and the fourth light source signal have a same phase as the first light source signal.

During implementation, a first optoelectronic detector may be used to detect the third sub modulated optical signal, to obtain the intensity information of the third sub modulated optical signal. A second optoelectronic detector may be used to detect the third light source signal, to obtain the intensity information of the third light source signal. A homodyne detector may be used to detect a signal that is obtained after the coherence between the fourth sub modulated optical signal and the fourth light source signal, to obtain the intensity information obtained after the coherence between the fourth sub modulated optical signal and the fourth light source signal. Optionally, the homodyne detector may be replaced with a third optoelectronic detect.

Step S960. Obtain a second key based on the intensity information of the third sub modulated optical signal, the intensity information of the third light source signal, the intensity information obtained after the coherence between the fourth sub modulated optical signal and the fourth light source signal, and a preset second data obtaining algorithm.

Step S970. Store the second key, where the second key is a key obtained after a bit error occurs when the first key is modulated to the first light source signal, and the second key is a key to be used during communication with the receive-end device.

Optionally, step S960 may include obtaining the second key based on the intensity information of the third sub modulated optical signal, the intensity information of the third light source signal, the intensity information obtained after the coherence between the fourth sub modulated optical signal and the fourth light source signal, a beam splitting ratio for splitting the modulated optical signal, transmittance for attenuating the first sub modulated optical signal, and the preset second data obtaining algorithm.

Optionally, the preset second data obtaining algorithm may be $$x_A = \sqrt{2\frac{V_A+1}{V_A-1}} \sqrt{\eta_{310}k_{240}} \sqrt{I_S} \cos\left(\cos^{-1}\frac{I_{BHD}}{2\sqrt{I_S I_{LR}}}\right), \quad \text{(Formula 26)}$$

and $$p_A = -\sqrt{2\frac{V_A+1}{V_A-1}} \sqrt{\eta_{310}k_{240}} \sqrt{I_S} \sin\left(\cos^{-1}\frac{I_{BHD}}{2\sqrt{I_S I_{LR}}}\right),$$

where $I_S$ is the intensity information of the third sub modulated optical signal, $I_{LR}$ is the intensity information of the third light source signal, $I_{BHD}$ is the intensity information obtained after the coherence between the fourth sub modulated optical signal and the fourth light source signal, $k_{240}$ is the beam splitting ratio for splitting the modulated optical signal, $\eta_{310}$ is the transmittance for attenuating the first sub modulated optical signal, $V_A$ is an equivalent variance of an entangled state, and $x_A$ and $p_A$ constitute the second key.

During implementation, a data obtainer may be used to obtain the key carried in the second sub modulated optical signal, and a memory may be used to store data.

A specific operation manner of the method in this embodiment has been described in detail in the related device embodiment. Details are not described herein.

According to the key generation method provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by a transmit-end device. This avoids a case in which an association between the second key stored in the transmit-end device and the key used for communication with the receive-end device is relatively weak. Further, this can improve a success rate of preparing and transmitting a key, thereby avoiding system resource waste.

Figure 13:
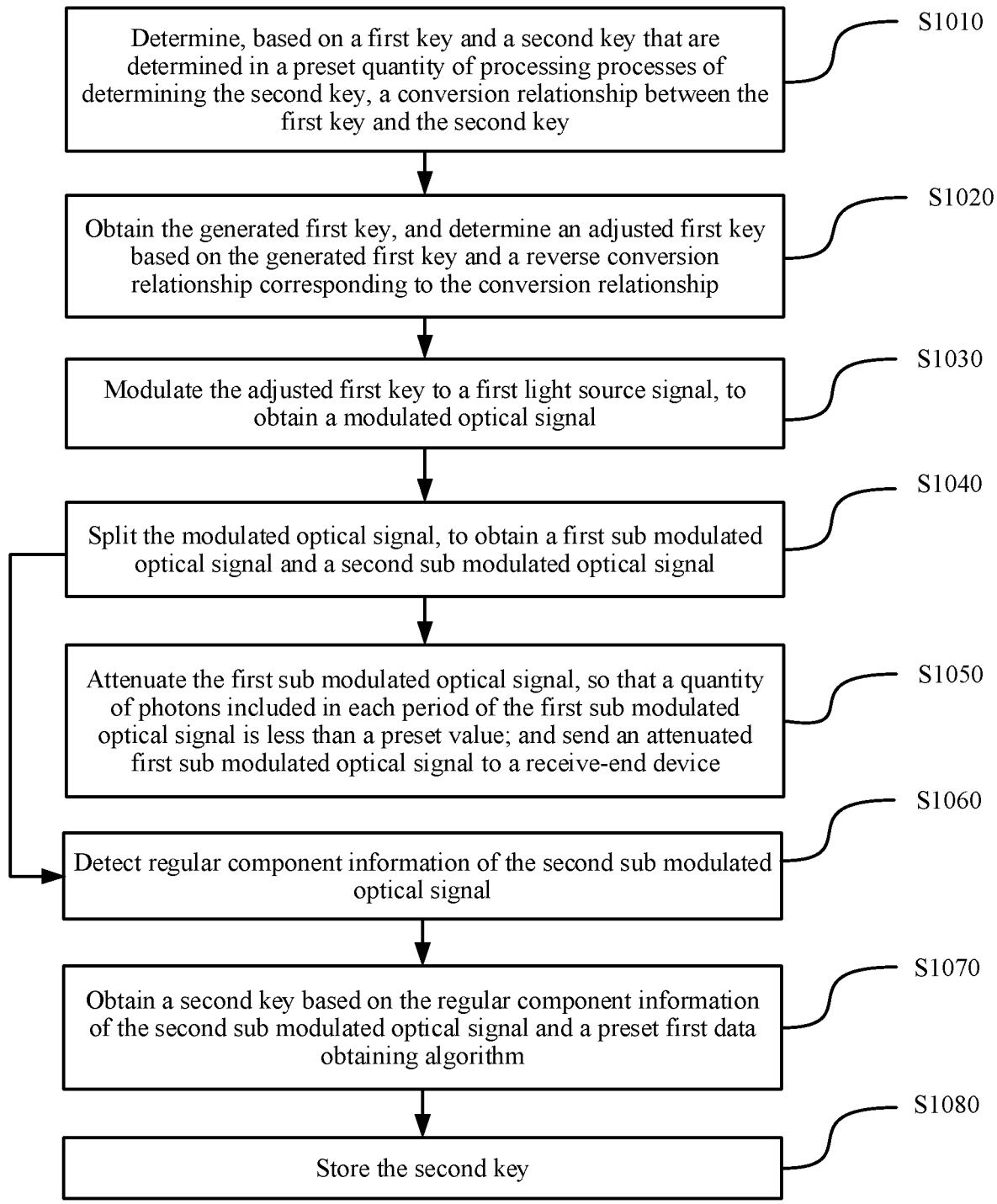
FIG. 13 is a schematic flowchart of a key generation method according to an example embodiment.

An example embodiment of this application provides a key generation method. As shown in FIG. 13, a processing procedure of the method may include the following steps.

Step S1010. Determine, based on a first key and a second key that are determined in a preset quantity of processing processes of determining the second key, a conversion relationship between the first key and the second key.

Step S1020. Obtain the generated first key, and determine an adjusted first key based on the generated first key and a reverse conversion relationship corresponding to the conversion relationship.

Step S1030. Modulate the adjusted first key to a first light source signal, to obtain a modulated optical signal.

During implementation, a light source generator such as a laser may be used to generate the first light source signal, and a key generator such as a quantum random number generator may be used to generate the first key.

Step S1040. Split the modulated optical signal, to obtain a first sub modulated optical signal and a second sub modulated optical signal.

During implementation, a beam splitter may be used to split the modulated optical signal.

Step S1050. Attenuate the first sub modulated optical signal such that a quantity of photons included in each period of the first sub modulated optical signal is less than a preset value, and send an attenuated first sub modulated optical signal to a receive-end device.

During implementation, the first sub modulated optical signal attenuated using an attenuator may be automatically sent to the receive-end device through an optical path such as an optical fiber.

Step S1060. Detect regular component information of the second sub modulated optical signal.

During implementation, a heterodyne detector may be used to detect the second sub modulated optical signal, to obtain the regular component information carried in the second sub modulated optical signal.

Step S1070. Obtain the second key based on the regular component information of the second sub modulated optical signal and a preset first data obtaining algorithm.

During implementation, a processor may be used to obtain the second key based on the regular component information of the second sub modulated optical signal and the preset first data obtaining algorithm.

Step S1080. Store the second key, where the second key is a key obtained after a bit error occurs when the first key is modulated to the first light source signal, and the second key is a key to be used during communication with the receive-end device.

A specific operation manner of the method in this embodiment has been described in detail in the related device embodiment. Details are not described herein.

According to the key generation method provided in this embodiment of this application, the first key is not directly used as a key used for communication with the receive-end device, and instead, a key carried in a modulated optical signal obtained through modulation is obtained and used as the key used for communication with the receive-end device. There is a relatively strong association between the obtained key carried in the modulated optical signal and a key carried in a modulated optical signal actually sent by a transmit-end device. This avoids a case in which an association between the second key stored in the transmit-end device and the key used for communication with the receive-end device is relatively weak. Further, this can improve a success rate of preparing and transmitting a key, thereby avoiding system resource waste.

A person skilled in the art can easily figure out another implementation solution of this application after considering the specification and practicing the disclosure that is disclosed herein. This application is intended to cover any variations, functions, or adaptive changes of this application. These variations, functions, or adaptive changes comply with general principles of this application, and include common knowledge or a commonly used technical means in the technical field that is not disclosed in this application. The specification and the embodiments are merely considered as examples, and the actual scope of this application are pointed out by the following claims.

It should be understood that this application is not limited to the accurate structures that are described above and that are shown in the accompanying drawings, and modifications and changes may be made without departing from the scope of this application. The scope of this application is limited only by the appended claims.

What is claimed is:

1. A key generation device, comprising:
a key generator configured to generate a first key;
a modulator coupled to the key generator and configured to modulate the first key to a first light source signal to obtain a modulated optical signal;
a first beam splitter coupled to the modulator and configured to split the modulated optical signal to obtain a first sub-modulated optical signal and a second sub-modulated optical signal;
an attenuator coupled to the first beam splitter and configured to:
attenuate the first sub-modulated optical signal in a manner that a quantity of photons comprised in each period of the attenuated first sub-modulated optical signal is less than a preset value; and
send the attenuated first sub-modulated optical signal to a receive-end device;
a data obtainer comprising a heterodyne detector, a first analog-to-digital converter, and a processor, wherein the data obtainer is coupled to the first beam splitter and configured to obtain, after a bit error occurs when the first key is modulated to the first light source signal, a second key carried in the second sub-modulated optical signal; and
a memory coupled to the data obtainer and configured to store the second key in the memory for communication with the receive-end device.

2. The key generation device of claim 1, further comprising:
a light source generator configured to produce an original light source signal;
a second beam splitter coupled to the light source generator and configured to split the original light source signal to obtain the first light source signal and a second light source signal,
wherein the heterodyne detector is configured to detect the second sub-modulated optical signal and the second light source signal to obtain a first analog electrical signal, wherein the first analog electrical signal carries regular component information of the second sub-modulated optical signal;
wherein the first analog-to-digital converter is coupled to the heterodyne detector and is configured to:
perform analog-to-digital conversion on the first analog electrical signal to obtain a first digital electrical signal, wherein the first digital electrical signal carries the regular component information of the second sub-modulated optical signal; and
send the first digital electrical signal; and
wherein the processor is coupled to the first analog-to-digital converter and is configured to:
receive the first digital electrical signal from the first analog-to-digital converter; and
obtain the second key based on the regular component information of the second sub-modulated optical signal and a preset first data obtaining algorithm.

3. The key generation device of claim 2, wherein the processor is further configured to obtain the second key based on the regular component information of the second sub-modulated optical signal, detection efficiency of the heterodyne detector, intensity information of the second light source signal, a beam splitting ratio of the first beam splitter, transmittance of the attenuator, and the preset first data obtaining algorithm.

4. The key generation device of claim 3, wherein the preset first data obtaining algorithm comprises the following equations:

$$x_A = \frac{1}{\eta_D}\sqrt{\frac{2\eta_{310}k_{240}}{I_{LO}}\frac{V_A+1}{V_A-1}}\,X, \text{ and}$$

$$p_A = -\frac{1}{\eta_D}\sqrt{\frac{2\eta_{310}k_{240}}{I_{LO}}\frac{V_A+1}{V_A-1}}\,P,$$

where $\eta_D$ is the detection efficiency of the heterodyne detector, $I_{LO}$ is the intensity information of the second light source signal, $k_{240}$ is the beam splitting ratio of the first beam splitter, $\eta_{310}$ is the transmittance of the attenuator, $V_A$ is an equivalent variance of an entangled state, X and P are the regular component information of the second sub modulated optical signal, and $x_A$ and $p_A$ constitute the second key.

5. The key generation device of claim 1, further comprising a light source generator configured to produce an original light source signal, and wherein the key generation device further comprises:
a third beam splitter configured to split the original light source signal to obtain the first light source signal and a second light source signal;
a fourth beam splitter coupled to the third beam splitter and configured to split the second light source signal to obtain a first sub light source signal and a second sub light source signal;
a fifth beam splitter coupled to the first beam splitter, and configured to split the second sub-modulated optical signal to obtain a third sub-modulated optical signal and a fourth sub-modulated optical signal;
a first optoelectronic detector coupled to the fifth beam splitter and configured to detect the third sub-modulated optical signal to obtain a second analog electrical signal that carries intensity information of the third sub-modulated optical signal;
a homodyne detector coupled to the fifth beam splitter and configured to detect the first sub light source signal and the fourth sub-modulated optical signal to obtain a third analog electrical signal that carries intensity information of a signal, wherein the third analog signal is obtained after coherence between the first sub light source signal and the fourth sub-modulated optical signal;

a second optoelectronic detector coupled to the fourth beam splitter and configured to detect the second sub light source signal to obtain a fourth analog electrical signal that carries intensity information of the second sub light source signal;

a second analog-to-digital converter coupled to the first optoelectronic detector, the homodyne detector, and the second optoelectronic detector and configured to:
  perform analog-to-digital conversion on the second analog electrical signal to obtain a second digital electrical signal that carries the intensity information of the third sub-modulated optical signal;
  perform analog-to-digital conversion on the third analog electrical signal to obtain a third digital electrical signal that carries the intensity information of the signal, wherein the third digital electrical signal is obtained after the coherence between the first sub light source signal and the fourth sub-modulated optical signal;
  perform analog-to-digital conversion on the fourth analog electrical signal to obtain a fourth digital electrical signal that carries the intensity information of the second sub light source signal; and
  send the second digital electrical signal, the third digital electrical signal, and the fourth digital electrical signal, and a processor coupled to the second analog-to-digital converter and configured to:
  receive the second digital electrical signal, the third digital electrical signal, and the fourth digital electrical signal; and
  obtain the second key based on the intensity information of the third sub-modulated optical signal, the intensity information of the signal, the intensity information of the second sub light source signal, and a preset second data obtaining algorithm.

6. The key generation device of claim 5, wherein the processor is further configured to obtain the second key based on the intensity information of the third sub-modulated optical signal, the intensity information of the signal, the intensity information of the second sub light source signal, a beam splitting ratio of the first beam splitter, transmittance of the attenuator, and the preset second data obtaining algorithm.

7. The key generation device of claim 6, wherein the preset second data obtaining algorithm comprises the following equations:

$$x_A = \sqrt{2\frac{V_A+1}{V_A-1}} \sqrt{\eta_{310}k_{240}} \sqrt{I_S} \cos\left(\cos^{-1}\frac{I_{BHD}}{2\sqrt{I_S I_{LR}}}\right), \text{ and}$$

$$p_A = -\sqrt{2\frac{V_A+1}{V_A-1}} \sqrt{\eta_{310}k_{240}} \sqrt{I_S} \sin\left(\cos^{-1}\frac{I_{BHD}}{2\sqrt{I_S I_{LR}}}\right),$$

where $I_S$ is the intensity information of the third sub modulated optical signal, $I_{LR}$ is the intensity information of the second sub light source signal, $I_{BHD}$ is the intensity information of the signal obtained after the coherence between the first sub light source signal and the fourth sub-modulated optical signal, $k_{240}$ is the beam splitting ratio of the first beam splitter, $\eta_{310}$ is the transmittance of the attenuator, $V_A$ is an equivalent variance of an entangled state, and $x_A$ and $p_A$ constitute the second key.

8. The key generation device of claim 2, wherein the processor is further configured to:
  determine a conversion relationship between the first key and the second key;
  obtain the first key; and
  determine an adjusted first key based on the first key and a reverse conversion relationship of the conversion relationship, and
  wherein the modulator is further configured to modulate the adjusted first key to the first light source signal to obtain the modulated optical signal.

9. The key generation device of claim 5, wherein the processor is further configured to:
  determine a conversion relationship between the first key and the second key;
  obtain the first key generated; and
  determine an adjusted first key based on the first key and a reverse conversion relationship of the conversion relationship, and
  wherein the modulator is further configured to modulate the adjusted first key to the first light source signal to obtain the modulated optical signal.

10. A key generation method, comprising:
  generating a first key;
  modulating the first key to a first light source signal to obtain a modulated optical signal;
  splitting the modulated optical signal to obtain a first sub-modulated optical signal and a second sub-modulated optical signal;
  attenuating the first sub-modulated optical signal in a manner that a quantity of photons comprised in each period of the attenuated first sub-modulated optical signal is less than a preset value;
  sending the attenuated first sub modulated optical signal to a receive-end device;
  obtaining, after a bit error occurs when the first key is modulated to the first light source signal, a second key carried in the second sub-modulated optical signal for communication with the receive-end device; and
  storing the second key.

11. The key generation method of claim 10, further comprising:
  detecting regular component information of the second sub-modulated optical signal; and
  obtaining the second key based on the regular component information of the second sub-modulated optical signal and a preset first data obtaining algorithm.

12. The key generation method of claim 11, further comprising obtaining the second key based on the regular component information of the second sub-modulated optical signal, detection efficiency of a heterodyne detector for detecting the regular component information of the second sub-modulated optical signal, intensity information of a second light source signal used for detecting the regular component information, a beam splitting ratio for splitting the modulated optical signal, transmittance for attenuating the first sub-modulated optical signal, and the preset first data obtaining algorithm, wherein the second light source signal and the first light source signal have a same phase.

13. The key generation method of claim 12, wherein the preset first data obtaining algorithm comprises the following equations:

$$x_A = \frac{1}{\eta_D}\sqrt{\frac{2\eta_{310}k_{240}}{I_{LO}}\frac{V_A+1}{V_A-1}}\,X, \text{ and}$$

$$p_A = -\frac{1}{\eta_D}\sqrt{\frac{2\eta_{310}k_{240}}{I_{LO}}\frac{V_A+1}{V_A-1}}\,P,$$

where $\eta_D$ is the detection efficiency of the heterodyne detector, $I_{LO}$ is the intensity information of the second light source signal, $k_{240}$ is the beam splitting ratio for splitting the modulated optical signal, $\eta_{310}$ is the transmittance for attenuating the first sub-modulated optical signal, $V_A$ is an equivalent variance of an entangled state, X and P are the regular component information of the second sub-modulated optical signal, and $x_A$ and $p_A$ constitute the second key.

14. The key generation method of claim 10, further comprising:
detecting intensity information of a third sub-modulated optical signal, intensity information of a third light source signal, and intensity information obtained after coherence between a fourth sub-modulated optical signal and a fourth light source signal;
splitting the second sub-modulated optical signal to obtain the third sub-modulated optical signal and the fourth sub-modulated optical signal, wherein the third light source signal and the fourth light source signal have a same phase as the first light source signal; and
obtaining the second key based on the intensity information of the third sub-modulated optical signal, the intensity information of the third light source signal, the intensity information obtained after the coherence between the fourth sub-modulated optical signal and the fourth light source signal, and a preset second data obtaining algorithm.

15. The key generation method of claim 14, further comprising obtaining the second key based on the intensity information of the third sub-modulated optical signal, the intensity information of the third light source signal, the intensity information obtained after the coherence between the fourth sub-modulated optical signal and the fourth light source signal, a beam splitting ratio for splitting the modulated optical signal, transmittance for attenuating the first sub-modulated optical signal, and the preset second data obtaining algorithm.

16. The key generation method of claim 15, wherein the preset second data obtaining algorithm is according to the following equations:

$$x_A = \sqrt{2\frac{V_A+1}{V_A-1}}\,\sqrt{\eta_{310}k_{240}}\,\sqrt{I_S}\cos\left(\cos^{-1}\frac{I_{BHD}}{2\sqrt{I_S I_{LR}}}\right), \text{ and}$$

$$p_A = -\sqrt{2\frac{V_A+1}{V_A-1}}\,\sqrt{\eta_{310}k_{240}}\,\sqrt{I_S}\sin\left(\cos^{-1}\frac{I_{BHD}}{2\sqrt{I_S I_{LR}}}\right),$$

where $I_S$ is the intensity information of the third sub modulated optical signal, $I_{LR}$ is the intensity information of the third light source signal, $I_{BHD}$ is the intensity information obtained after the coherence between the fourth sub-modulated optical signal and the fourth light source signal, $k_{240}$ is the beam splitting ratio for splitting the modulated optical signal, $\eta_{310}$ is the transmittance for attenuating the first sub-modulated optical signal, $V_A$ is an equivalent variance of an entangled state, and $x_A$ and $p_A$ constitute the second key.

17. The key generation method of claim 10, further comprising:
determining a conversion relationship between the first key and the second key;
obtaining the first key;
determining an adjusted first key based on the generated first key and a reverse conversion relationship of the conversion relationship; and
modulating the adjusted first key to the first light source signal to obtain the modulated optical signal.

18. The key generation method of claim 10, further comprising:
splitting an original light source signal to obtain the first light source signal and a second light source signal;
splitting the second light source signal to obtain a first sub light source signal and a second sub light source signal;
splitting the second sub-modulated optical signal to obtain a third sub-modulated optical signal and a fourth sub-modulated optical signal;
detecting the third sub-modulated optical signal to obtain a second analog electrical signal that carries intensity information of the third sub-modulated optical signal;
detecting the first sub light source signal and the fourth sub-modulated optical signal to obtain a third analog electrical signal that carries intensity information of a signal, wherein the third analog signal is obtained after coherence between the first sub light source signal and the fourth sub-modulated optical signal;
detecting the second sub light source signal to obtain a fourth analog electrical signal that carries intensity information of the second sub light source signal;
performing analog-to-digital conversion on the second analog electrical signal to obtain a second digital electrical signal that carries the intensity information of the third sub-modulated optical signal.

19. The key generation method of claim 10, further comprising:
producing an original light source signal;
splitting the original light source signal to obtain the first light source signal and a second light source signal;
detecting the second sub-modulated optical signal and the second light source signal to obtain a first analog electrical signal, wherein the first analog electrical signal carries regular component information of the second sub-modulated optical signal;
performing analog-to-digital conversion on the first analog electrical signal to obtain a first digital electrical signal, wherein the first digital electrical signal carries the regular component information of the second sub-modulated optical signal.

20. The key generation method of claim 19, further comprising obtaining the second key based on the regular component information of the second sub-modulated optical signal and a preset first data obtaining algorithm.

* * * * *